(12) United States Patent
Nishikawa

(10) Patent No.: US 11,360,724 B2
(45) Date of Patent: *Jun. 14, 2022

(54) INFORMATION PROCESSING SYSTEM AND CONTROL METHOD TO EXECUTE A FUNCTION OF PRINTER USING LOCAL AUTHENTICATION INFORMATION ASSOCIATED WITH THE FUNCTION ON CLIENT DEVICE LOGGING INTO CLOUD SERVER

(71) Applicant: CANON KABUSHIKI KAISHA, Tokyo (JP)

(72) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,177

(22) Filed: Jul. 2, 2020

(65) Prior Publication Data

US 2020/0333992 A1    Oct. 22, 2020

Related U.S. Application Data

(63) Continuation of application No. 15/975,644, filed on May 9, 2018, now Pat. No. 10,761,793.

(30) Foreign Application Priority Data

May 17, 2017    (JP) .............................. JP2017-098379

(51) Int. Cl.
*G06F 3/12* (2006.01)
*H04N 1/00* (2006.01)
(Continued)

(52) U.S. Cl.
CPC .......... *G06F 3/1238* (2013.01); *G06F 3/1222* (2013.01); *G06F 3/1231* (2013.01); *G06F 3/1287* (2013.01); *G06F 3/1288* (2013.01); *G06F 21/608* (2013.01); *H04L 63/0815* (2013.01); *H04L 63/0892* (2013.01); *H04L 63/102* (2013.01); *H04N 1/00204* (2013.01); *H04N 1/00217* (2013.01); *H04N 1/00244* (2013.01); *G06F 3/1203* (2013.01); *G06F 2221/2141* (2013.01); *G06K 15/4095* (2013.01); *H04L 41/5051* (2013.01); *H04N 21/21* (2013.01); *H04N 2201/0094* (2013.01); *H04N 2201/3233* (2013.01)

(58) Field of Classification Search
None
See application file for complete search history.

(56) References Cited

U.S. PATENT DOCUMENTS 9,749,480 B1 *  8/2017  Katano .............. H04N 1/00225
2011/0035785 A1   2/2011  Mihara
(Continued)

FOREIGN PATENT DOCUMENTS

CN    104346165 A    2/2015
EP    2023260 A1     2/2009

*Primary Examiner* — Haris Sabah
(74) *Attorney, Agent, or Firm* — Canon U.S.A., Inc. I.P. Division

(57) ABSTRACT

A function of a device is displayed as a first display on a client device, and local user authentication information is displayed as a second display according to the function of the device selected on the first display on the client device.

20 Claims, 25 Drawing Sheets

(51) Int. Cl.
  *H04L 9/40*   (2022.01)
  *G06F 21/60*  (2013.01)
  *H04L 41/5051*    (2022.01)
  *H04N 21/21*      (2011.01)
  *G06K 15/00*      (2006.01)

(56) References Cited

U.S. PATENT DOCUMENTS

| | | | |
|---|---|---|---|
| 2011/0242598 A1* | 10/2011 | Ohara | G06F 3/1205 |
| | | | 358/1.15 |
| 2012/0092718 A1* | 4/2012 | Sato | G06F 3/1288 |
| | | | 358/1.15 |
| 2012/0096545 A1 | 4/2012 | Koeda | |
| 2012/0099127 A1* | 4/2012 | Nagata | H04N 1/0044 |
| | | | 358/1.13 |
| 2013/0070288 A1* | 3/2013 | Muranaka | G06F 3/1204 |
| | | | 358/1.15 |
| 2015/0015908 A1* | 1/2015 | Tanaka | H04N 1/4413 |
| | | | 358/1.14 |
| 2015/0178026 A1* | 6/2015 | Sato | G06F 3/1238 |
| | | | 358/1.14 |
| 2016/0364192 A1* | 12/2016 | Fujii | G06F 3/1222 |

\* cited by examiner

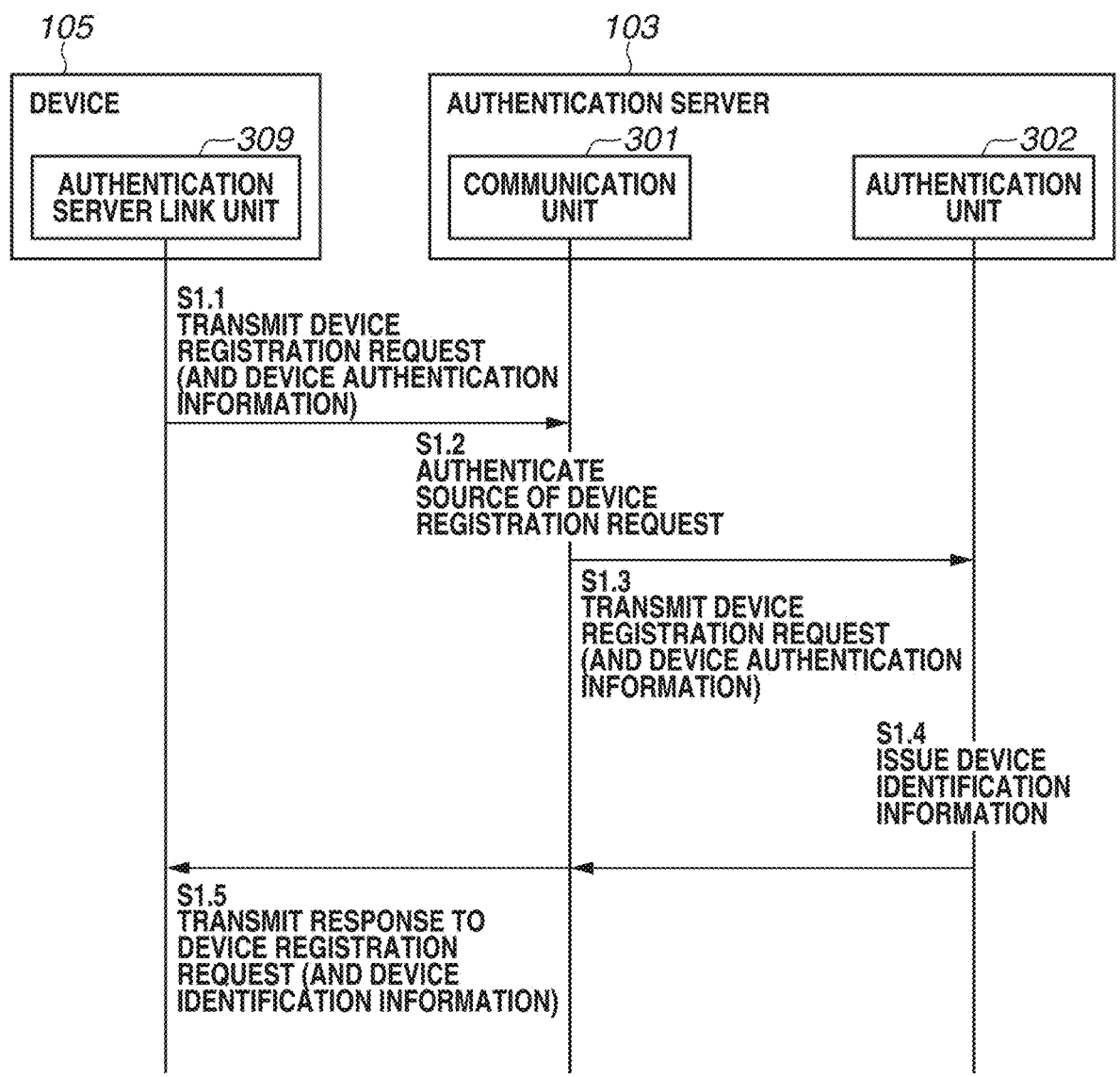

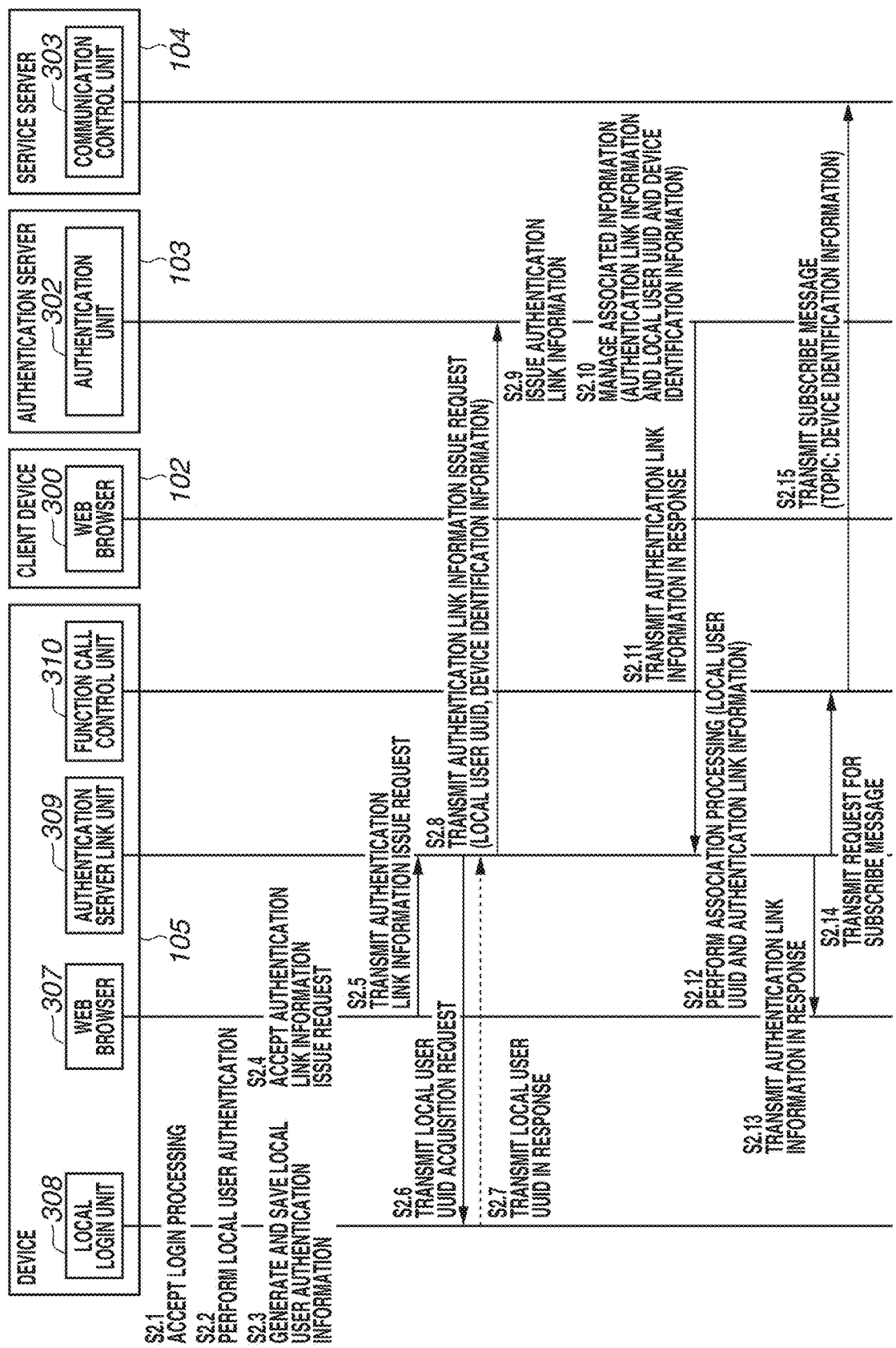

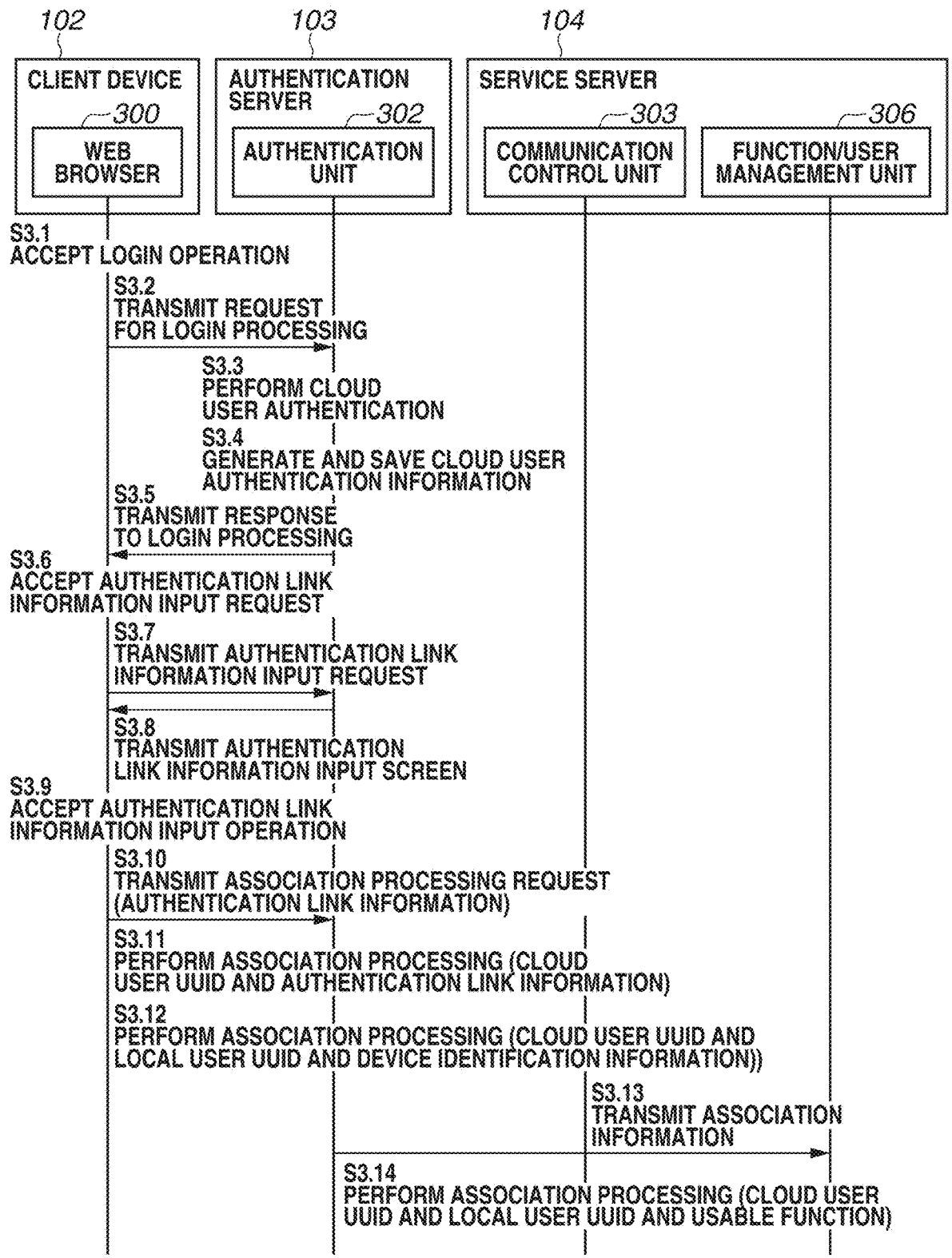

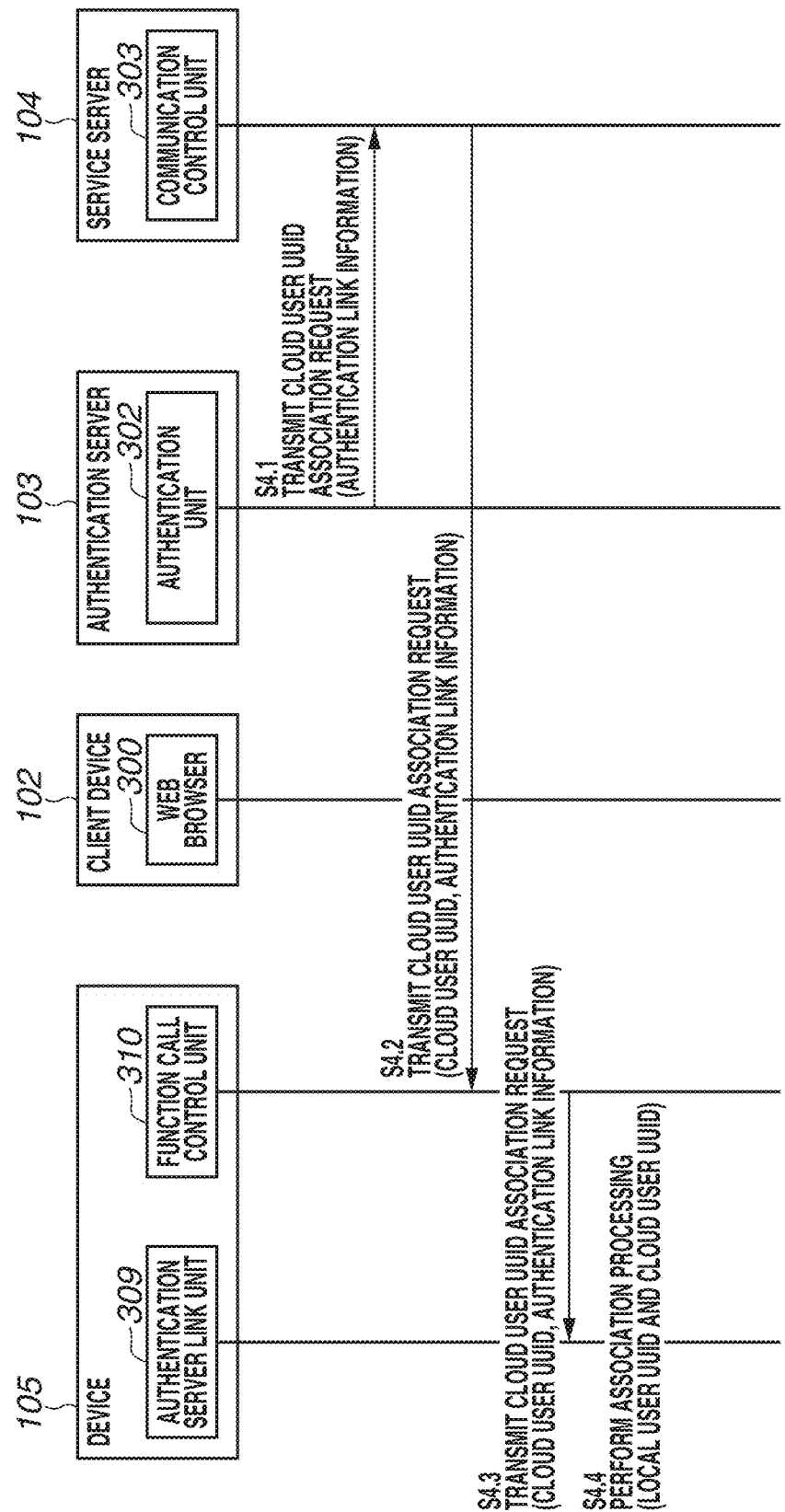

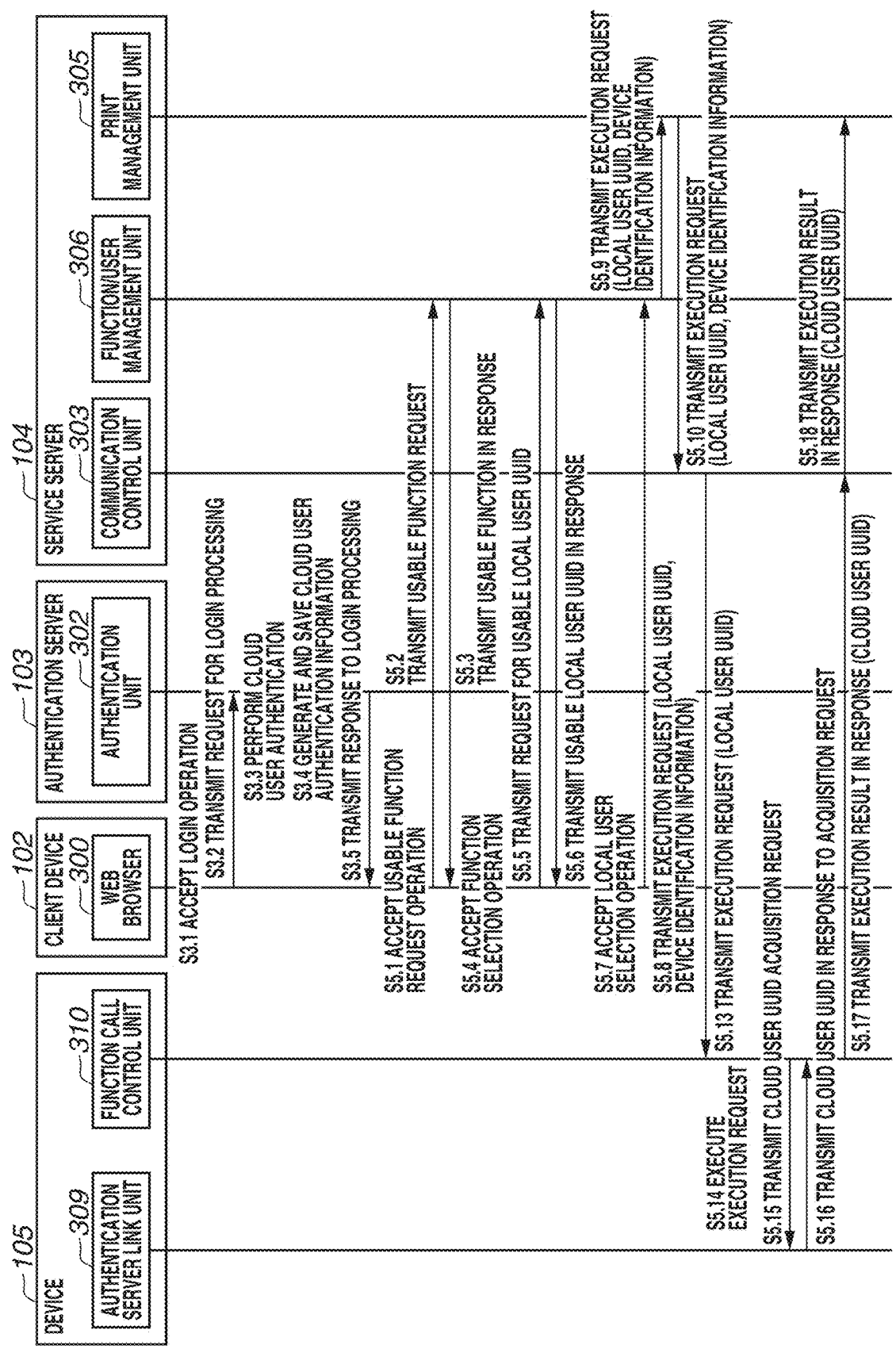

FIG.10A

[UPDATE]

RESULT LIST

| DATE AND TIME | DEVICE NAME | FUNCTION NAME | STATE | USER | USER SELECTION |
|---|---|---|---|---|---|
| 2010/11/02 18:00:00 | MFP001 | PRINT | ENDED NORMALLY | AAA1 | MANUALLY |
| 2010/11/01 18:00:17 | MFP001 | PRINT | ENDED NORMALLY | AAA1 | MANUALLY |

FIG.10B

[UPDATE]

RESULT LIST

| DATE AND TIME | DEVICE NAME | FUNCTION NAME | STATE | USER | USER SELECTION | |
|---|---|---|---|---|---|---|
| 2010/11/02 18:00:00 | MFP001 | PRINT | ENDED NORMALLY | AAA1 | MANUALLY | [RE-EXECUTE] |
| 2010/11/01 18:00:17 | MFP001 | PRINT | ENDED NORMALLY | AAA1 | MANUALLY | [RE-EXECUTE] |

FIG.12

| FUNCTION | PRINT ⌄ |
|---|---|
| USER ALLOWED TO EXECUTE FUNCTION | AAA1 ⌄ |

| FUNCTION | ~~PRINT~~ ⌄ |
|---|---|
| | AAA1 |
| USER ALLOWED TO EXECUTE FUNCTION | AAA2 |

| FUNCTION | PRINT ⌄ |
|---|---|
| USER ALLOWED TO EXECUTE FUNCTION | AAA2 ⌄ |

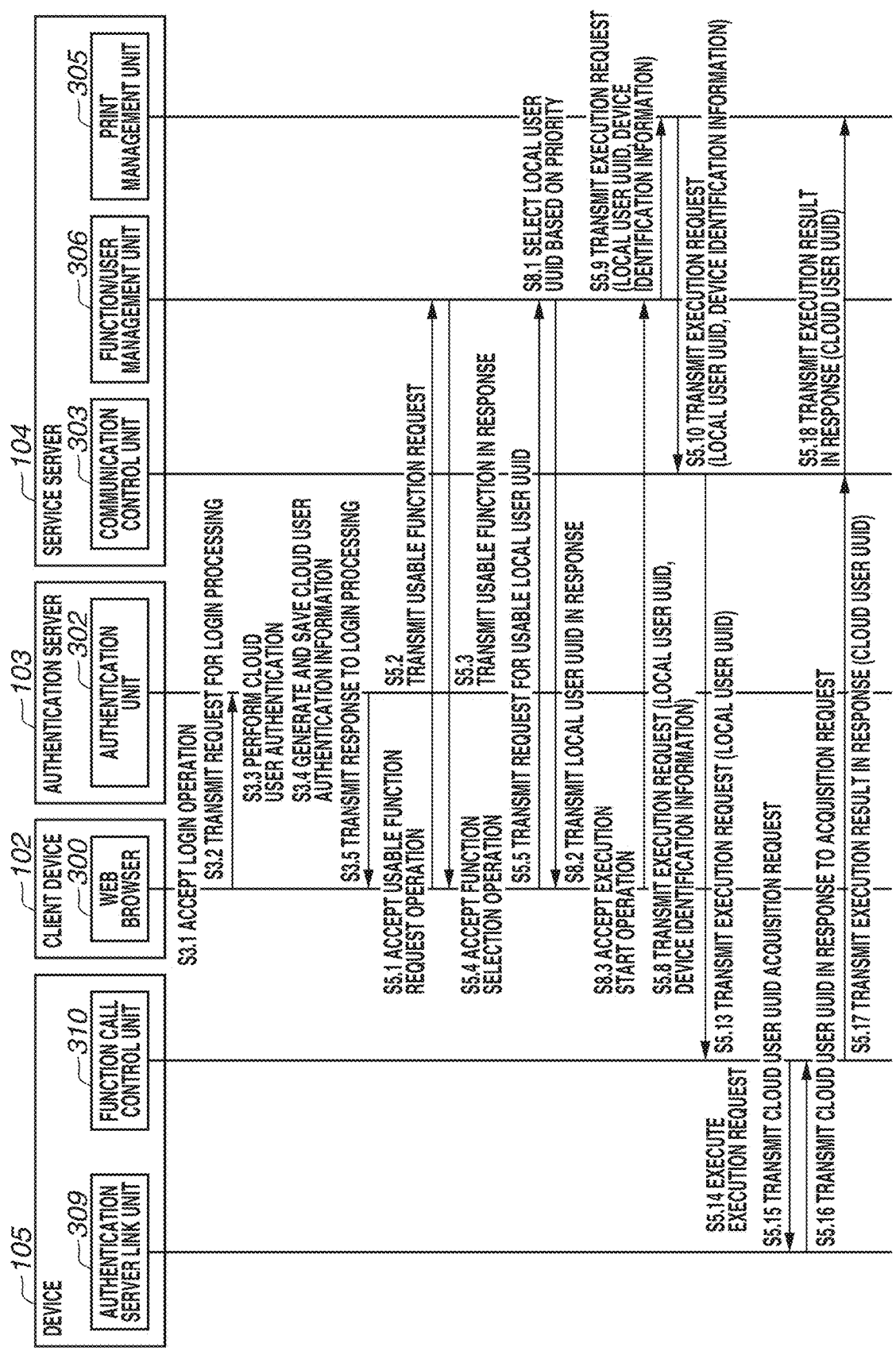

FIG.16A

FUNCTION | PRINT ˅

[ EXECUTE FUNCTION USING AAA1 ] [ SELECT DIFFERENT USER ]

FIG.16B

FUNCTION | PRINT ˅

USER ALLOWED TO EXECUTE FUNCTION | AAA1 ˅

FIG.16C

FUNCTION | PRINT ˅
AAA1
USER ALLOWED TO EXECUTE FUNCTION | AAA2

FUNCTION | PRINT ˅

USER ALLOWED TO EXECUTE FUNCTION | AAA2 ˅

FIG.17

| UPDATE |

RESULT LIST

| DATE AND TIME | DEVICE NAME | FUNCTION NAME | STATE | USER | USER SELECTION | |
|---|---|---|---|---|---|---|
| 2010/11/02 18:00:00 | MFP001 | PRINT | ENDED NORMALLY | AAA1 | AUTOMATICALLY | RE-EXECUTE |
| 2010/11/01 18:00:17 | MFP001 | PRINT | ENDED NORMALLY | AAA1 | MANUALLY | RE-EXECUTE |

FIG. 19A

[ UPDATE ]

RESULT LIST

| DATE AND TIME | DEVICE NAME | FUNCTION NAME | STATE | USER | USER SELECTION | |
|---|---|---|---|---|---|---|
| 2010/11/02 18:00:00 | MFP001 | PRINT | ENDED WITH ERROR | AAA1 | MANUALLY | [ RE-EXECUTE ] |
| 2010/11/01 18:00:17 | MFP001 | PRINT | ENDED NORMALLY | AAA1 | MANUALLY | [ RE-EXECUTE ] |

FIG. 19B

[ UPDATE ]

RESULT LIST

| DATE AND TIME | DEVICE NAME | FUNCTION NAME | STATE | USER | USER SELECTION | |
|---|---|---|---|---|---|---|
| 2010/11/02 18:00:00 | MFP001 | PRINT | ENDED WITH ERROR | AAA1 | MANUALLY | [ DISPLAY DETAILS ] |
| 2010/11/01 18:00:17 | MFP001 | PRINT | ENDED NORMALLY | AAA1 | MANUALLY | [ RE-EXECUTE ] |

FIG. 19C

DETAILS OF ERROR

PRINTING IS STOPPED DUE TO SHEET JAM    [ RE-EXECUTE ]

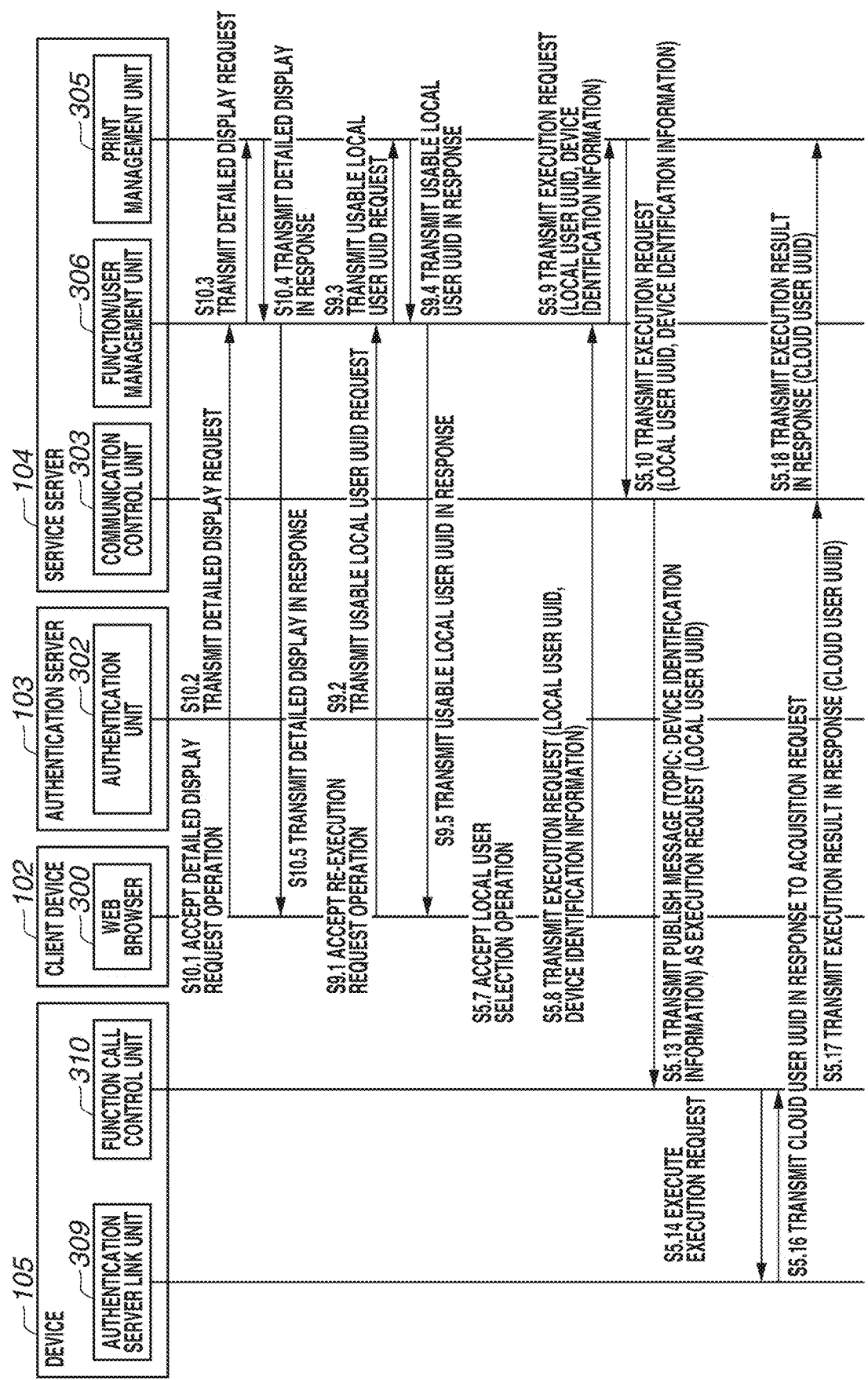

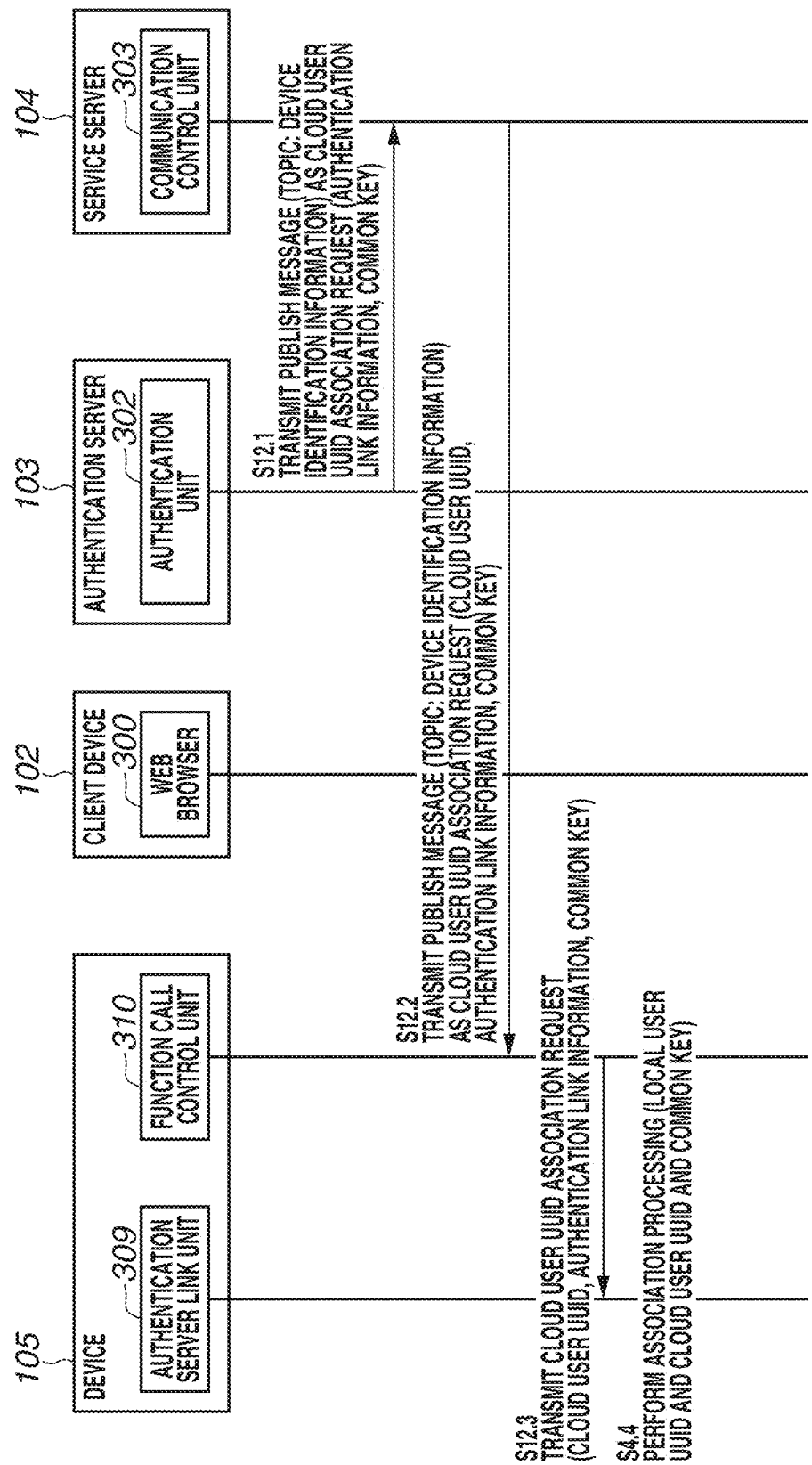

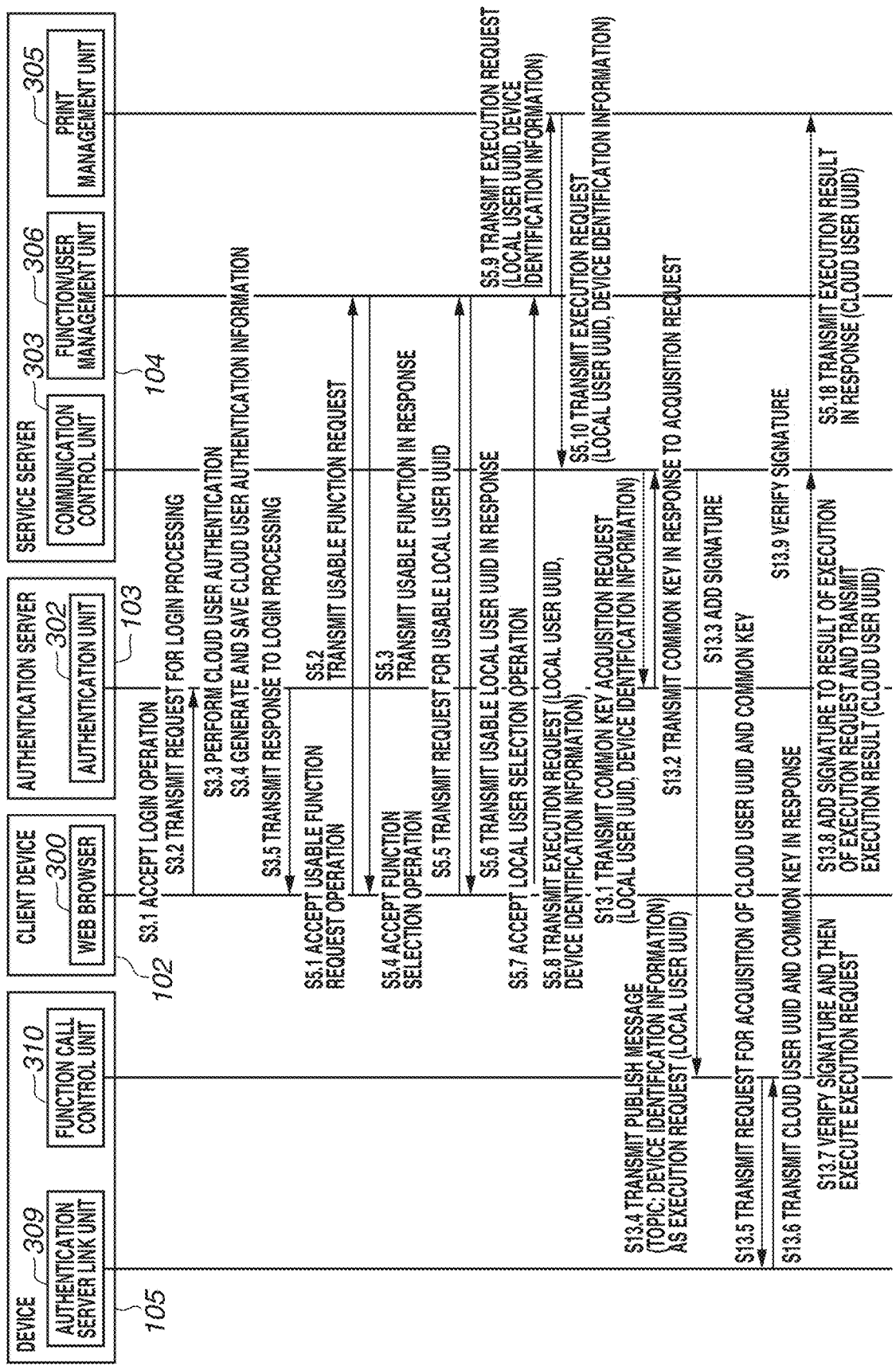

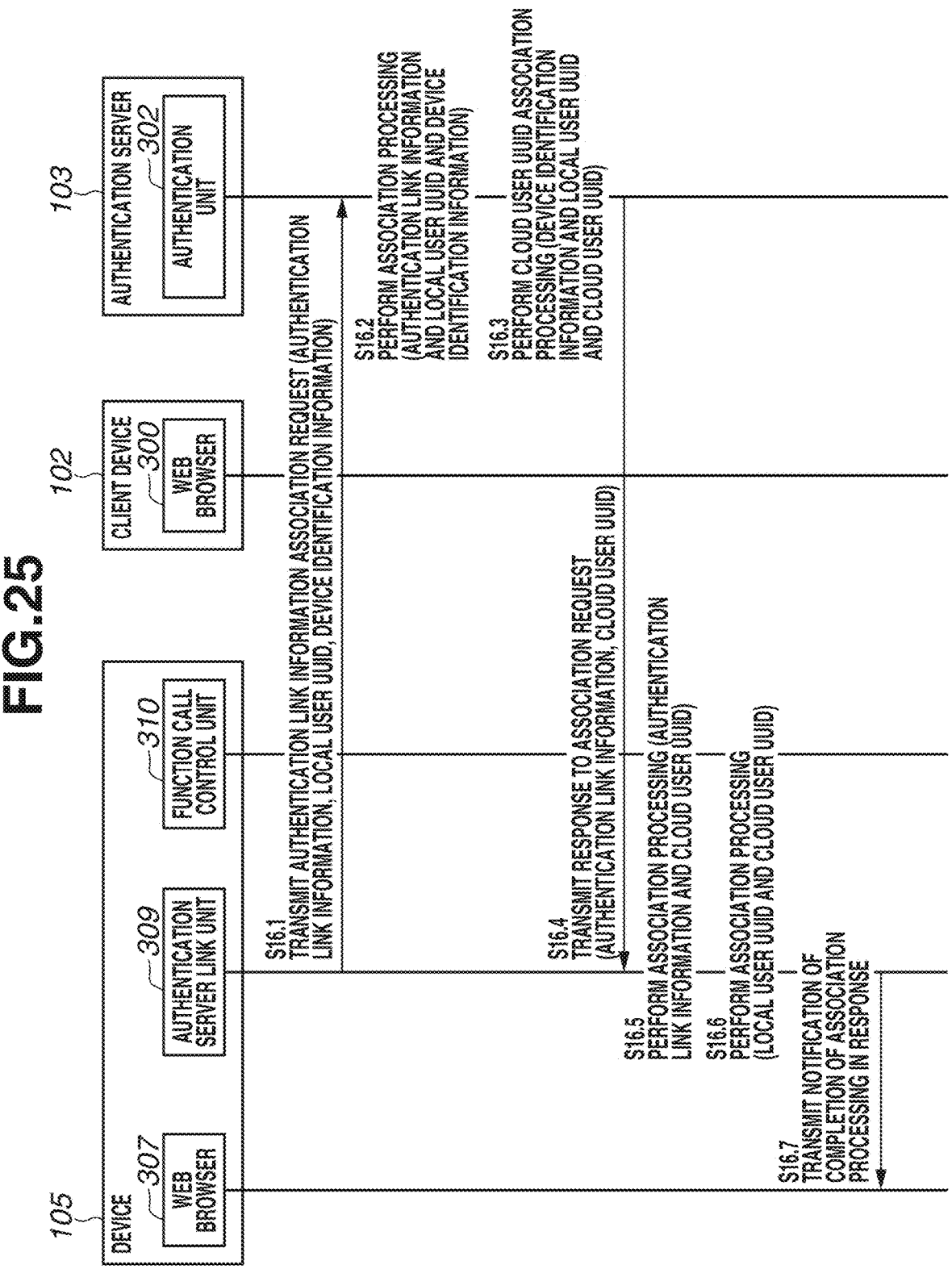

INFORMATION PROCESSING SYSTEM AND CONTROL METHOD TO EXECUTE A FUNCTION OF PRINTER USING LOCAL AUTHENTICATION INFORMATION ASSOCIATED WITH THE FUNCTION ON CLIENT DEVICE LOGGING INTO CLOUD SERVER

CROSS-REFERENCE TO RELATED APPLICATIONS

The present application is a continuation of U.S. patent application Ser. No. 15/975,644, filed on May 9, 2018, which claims priority from Japanese Patent Application No. 2017-098379 filed May 17, 2017, which are hereby incorporated by reference herein in their entireties.

BACKGROUND

Field

The present disclosure relates to an information processing system configured to execute a function of a device via a cloud system, and a control method.

Description of the Related Art

Services for transmitting data from a client device to another device via a cloud system have been available. Further, there is a device that identifies a user (hereinafter, referred to as "local user") wishing to use a function of the device and sets a local user account to limit access of the user to the functions of the device. The local user account is needed to execute a function of the device. Meanwhile, there is a cloud system that identifies a user (hereinafter, referred to as "cloud user") wishing to use a cloud service and sets a cloud user account to limit access of the user to the cloud services in the cloud system. The cloud user account is needed to execute a cloud service in the cloud system.

Japanese Patent Application Laid-Open No. 2016-18331 discusses a print system for executing printing of a print job if a user is authenticated based on user account information.

SUMMARY

According to various embodiments of the present disclosure, an information processing system includes a first management unit with which a cloud system manages in association with each other cloud user authentication information for uniquely identifying a plurality of cloud users using a cloud service, local user authentication information for uniquely identifying a plurality of local users using a function of a device, and information about the function of the device that is executable using the local user authentication information, and a second management unit with which the device manages the cloud user authentication information and the local user authentication information in association with each other. The information processing system further includes a display generation unit configured to display as a first display on a client device the information about the function of the device managed by the first management unit and display as a second display on the client device the local user authentication information managed by the first management unit in association with the information about the function of the device selected on the first display on the client device, an acceptance unit configured to accept selection of the function of the device that is selected on the first display on the client device using the local user authentication information selected on the second display on the client device, a first transmission unit with which the cloud system transmits to the device the local user authentication information managed by the first management unit in association with the cloud user authentication information and an execution request for execution of the function of the device corresponding to the selection accepted by the acceptance unit, an execution unit with which the device executes the execution request transmitted by the first transmission unit based on the local user authentication information, and a second transmission unit with which the device transmits to the cloud system the cloud user authentication information managed by the second management unit in association with the local user authentication information received together with the execution request from the cloud system and an execution result executed by the execution unit.

According to another embodiment, an information processing system includes a first management unit with which a cloud system manages in association with each other cloud user authentication information for uniquely identifying a plurality of cloud users using a cloud service, local user authentication information for uniquely identifying a plurality of local users using a function of a device, and information about the function of the device that is executable using the local user authentication information, and a second management unit with which the device manages the cloud user authentication information and the local user authentication information in association with each other. The information processing system further includes a display generation unit configured to display as a first display on a client device the local user authentication information managed by the first management unit and display as a second display on the client device the information about the function of the device managed by the first management unit in association with the local user authentication information selected on the first display on the client device, an acceptance unit configured to accept selection of the function of the device selected on the second display on the client device, a first transmission unit with which the cloud system transmits to the device the local user authentication information managed by the first management unit in association with the cloud user authentication information and an execution request for executing the function of the device corresponding to the selection accepted by the acceptance unit, an execution unit with which the device executes the execution request transmitted by the first transmission unit based on the local user authentication information, and a second transmission unit with which the device transmits to the cloud system the cloud user authentication information managed by the second management unit in association with the local user authentication information received together with the execution request from the cloud system and an execution result executed by the execution unit.

Further features will become apparent from the following description of exemplary embodiments with reference to the attached drawings.

BRIEF DESCRIPTION OF THE DRAWINGS

FIG. 4 is a sequence diagram illustrating a process of authenticating a device by an authentication server according to an exemplary embodiment.

FIG. 5 is a sequence diagram illustrating a process of issuing authentication link information according to an exemplary embodiment.

FIG. 6 is a sequence diagram illustrating user association processing of associating a local user universally unique identifier (UUID) with a cloud user UUID in the authentication server according to an exemplary embodiment.

FIG. 7 is a sequence diagram illustrating user association processing of associating a local user UUID with a cloud user UUID in the device according to an exemplary embodiment.

FIG. 8 is a sequence diagram illustrating function call processing according to a first exemplary embodiment.

FIGS. 10A and 10B are image diagrams each illustrating an execution result screen of the web browser according to an exemplary embodiment.

FIG. 12 is an image diagram illustrating a default screen according to an exemplary embodiment.

FIG. 15 is a sequence diagram illustrating function call processing according to a third exemplary embodiment.

FIGS. 16A, 16B, and 16C are image diagrams each illustrating a display screen of the web browser according to the third exemplary embodiment.

FIG. 17 is an image diagram illustrating an execution result screen of the web browser according to the third exemplary embodiment.

FIGS. 19A, 19B, and 19C are image diagrams each illustrating a re-execution screen according to the fourth exemplary embodiment.

FIG. 20 is a sequence diagram illustrating re-execution processing according to the fourth exemplary embodiment.

FIG. 21 is a sequence diagram illustrating user association processing in the device in a case of using a common key according to an exemplary embodiment.

FIG. 22 is a sequence diagram illustrating function call processing in the case of using the common key according to an exemplary embodiment.

FIG. 25 is a sequence diagram illustrating a process of associating a local user UUID and authentication link information in the authentication server and the device according to an exemplary embodiment.

DESCRIPTION OF THE EMBODIMENTS

One user registers a local user account in a device to use a function of the device and registers a cloud user account in a cloud system to use a cloud service. In a possible form, execution of a function of a multi-user device such as a multi-function peripheral (MFP), which is one of the cloud services, is requested using both user accounts, the multi-user device executes the requested function, and a result of the execution is transmitted from the multi-user device to the cloud system. In this form, there can be a case in which the multi-user device acquires an execution request from the cloud system through pull-type communication and transmits to the cloud system an execution result in response to the execution request. In the pull-type communication, the multi-user device requests the cloud system to acquire an execution request and receives the execution request as a response thereto from the cloud system to end the communication. Thus, although the execution result is transmitted from the multi-user device to the cloud system, since the pull-type communication through which the execution request is acquired and the communication through which the execution result is transmitted are non-synchronized communication and are independent of each other, the cloud system cannot determine which execution result is acquired in response to which execution request. Therefore, a method of associating a request with a response is needed to determine to which request (execution request) each response (execution result) is transmitted.

Further, there can be a case in which one user executes a function of the device using a plurality of different local user accounts. In this case, there arises a problem that the convenience in the execution of the function of the device using the plurality of local user accounts via the cloud system needs to be improved.

The present invention is directed to a technique capable of improving the convenience in the execution of a function of a device using a plurality of local user accounts via a cloud system.

The present invention can improve the convenience in the execution of a function of a device using a plurality of local user accounts via a cloud system.

Various exemplary embodiments of the present invention will be described below.

Figure 1:
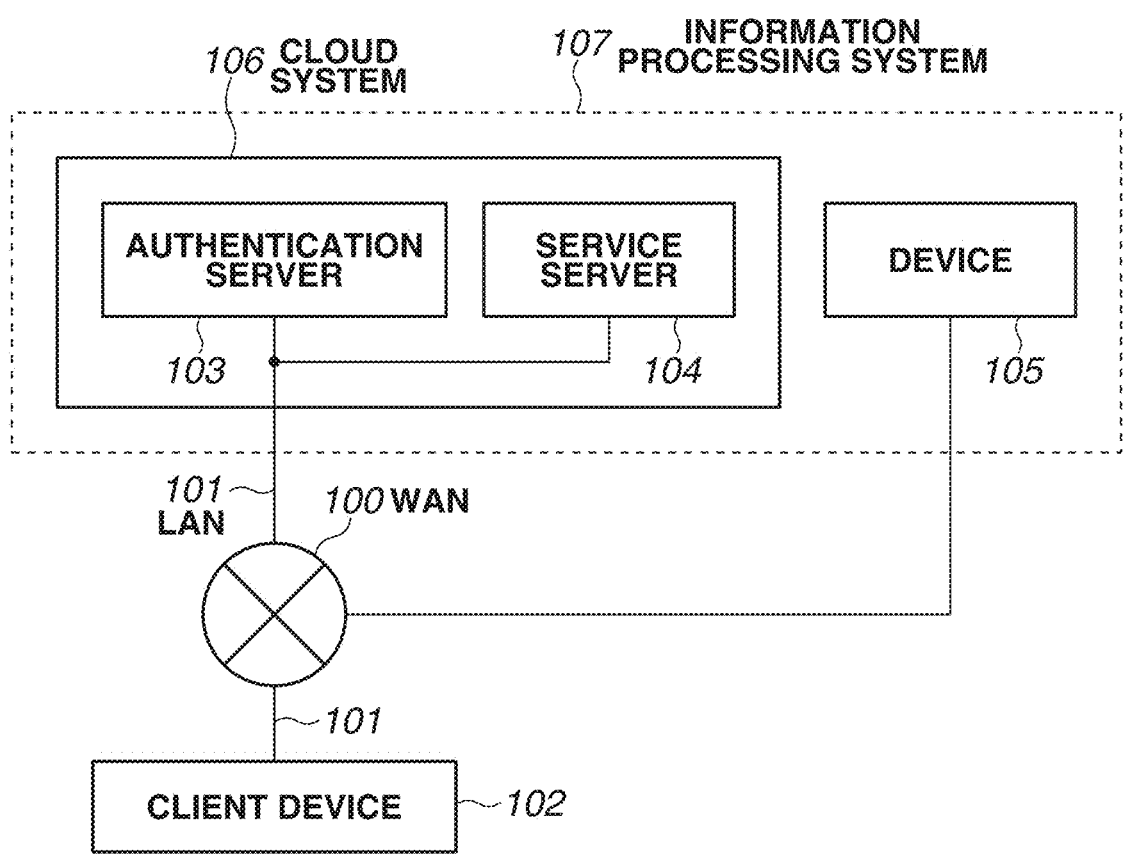
FIG. 1 is an entire view illustrating an information processing system according to an exemplary embodiment.

A device 105 and a cloud system 106 of an information processing system 107 according to an exemplary embodiment of the present invention and a client device 102 connected to the information processing system 107 will be described below with reference to FIG. 1. FIG. 1 illustrates a state in which the client device 102 is connected to a group of server computers of the information processing system 107 and the device 105 via a wide area network (WAN) 100. The WAN 100 is connected to each device via a local area network (LAN) 101.

The client device 102 is an information processing apparatus such as a personal computer (PC), smartphone, tablet, or image forming apparatus. An authentication server 103 authenticates users such as cloud users and local users and the device 105 such as a multi-function peripheral (MFP) and registers authentication information about the authentication.

A service server 104 is capable of communicating with the client device 102 and the device 105 via the WAN 100, and examples of the service server 104 include a server configured to perform Message Queuing Telemetry Transport (MQTT) Broker messaging. MQTT is a publish/subscribe-model messaging protocol. In the publish/subscribe model, a message is distributed from a message transmitter (hereinafter, referred to as "publisher") to a message receiver (hereinafter, referred to as "subscriber") via a MQTT broker which is a message broker. In the exemplary embodiments, the service server 104 includes the MQTT broker function. The subscriber designates the subscriber itself as a destination (hereinafter, referred to as "topic") of a message and transmits the message to the service server 104 and makes a reservation to receive (hereinafter, referred to as "subscribe") from the service server 104 messages corresponding to the topic. The message transmitted to the service server 104 for subscription by the subscriber will be referred to as "subscribe message".

The publisher transmits to the service server 104 a message with a designated topic. The service server 104 distributes (hereinafter, referred to as "publishes") a message to subscribers subscribing the same topic as the designated topic. The message transmitted with a designated topic for publication to the service server 104 by the publisher and the message transmitted to the subscribers will be referred to as "publish message".

The topic has a hierarchical structure segmented by "/" (e.g., /A/BC/D/E), and the subscriber designates either an exact or partial match search for the topic to receive messages of the topic corresponding to the designated condition. The service server 104 checks whether the topic of the received publish message matches or does not match the topic of the subscribe message, and if the topics matches, the service server 104 transmits the publish message to the subscriber. In this way, even when a firewall blocks communication from the service server 104 to the device 105, use of MQTT enables communication to the device 105.

While the service server 104 is described as including the MQTT broker function in the exemplary embodiments described below, any other protocol may be used by which the device 105 can acquire requests from the service server 104. In an alternative possible form, for example, the device 105 periodically transmits requests to the service server 104 to acquire information and receives requests from the service server 104 in response to the requests.

The service server 104 provides services such as a print service and a setting change service to the client device 102. As to the print service, if the device 105 is an image forming apparatus including a print function, the service server 104 receives print requests to the device 105 and provides to a web browser 300 a screen for checking print results. As to the setting change service, the service server 104 provides to the client device 102 a screen for accepting setting changes to the device 105 and a screen for checking the results of setting changes requested by the cloud users. Setting change requests issued according to user operations on the client device 102 are delivered to the device 105 via the service server 104. Further, the service server 104 also provides a function call control service to provide a print service, a setting change service, and the like. In the function call control service, control is performed to receive requests requested from the client device 102 and display execution results received from the device 105 only with respect to the cloud user having given the instruction in order to provide the print service, the setting change service, and the like. While an example in which the service server 104 provides the print service of the device 105 will be described in the exemplary embodiments described below, the service to be provided may be a different service such as the setting change service. Further, only one service such as the print service or the setting change service may be provided, or a plurality of services may be provided.

The device 105 is an information processing apparatus such as an image forming apparatus, PC, or smartphone and includes the function of managing information about a plurality of local users. The device 105 transmits a subscribe message with a designated topic to the service server 104, which is a MQTT broker, to receive a publish message matching the topic.

Further, the servers in the present exemplary embodiment such as the authentication server 103 and the service server 104 may each include a plurality of server computers, or one computer server may include the functions of the authentication server 103 and the service server 104. For example, the service server 104 can be divided into a MQTT broker and a function call control server that provides the function call control service.

Figure 2:
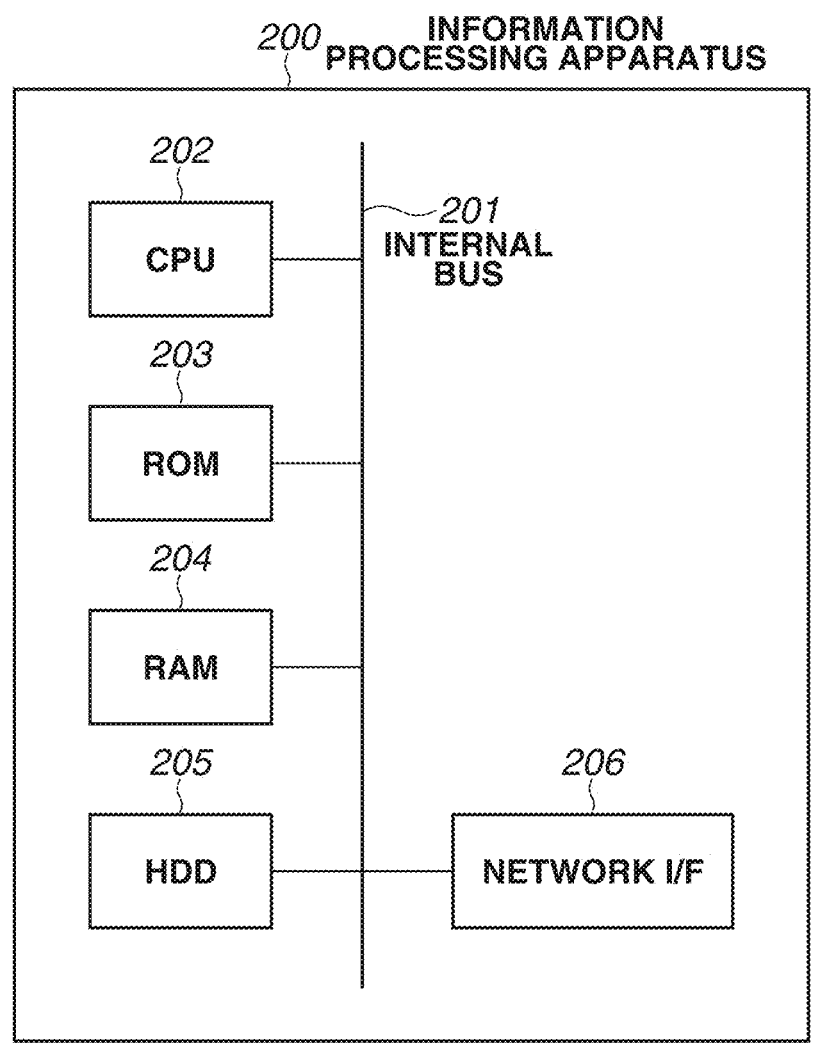
FIG. 2 is a block diagram illustrating an internal configuration of an information processing apparatus according to an exemplary embodiment.

FIG. 2 is a block diagram illustrating an internal configuration of an information processing apparatus 200, which is a server computer of the cloud system 106 illustrated in FIG. 1. The client device 102 and the device 105 have a similar internal configuration to the internal configuration of the information processing apparatus 200 illustrated in the block diagram of FIG. 2.

In the information processing apparatus 200, a central processing unit (CPU) 202, a read-only memory (ROM) 203, a random-access memory (RAM) 204, and a hard disk drive (HDD) 205 are connected to each other via an internal bus 201. The CPU 202 is a unit that executes a boot program in the ROM 203 to load an operating system (OS) or a control program stored in the HDD 205 into the RAM 204 and controls the information processing apparatus 200 based on the program.

The ROM 203 is a storage device storing the boot program of the information processing apparatus 200, various types of data, and the like.

The RAM 204 is a work memory used by the CPU 202 to execute instructions. The program stored in the ROM 203 is loaded into the RAM 204, and the CPU 202 sequentially reads instructions of the program and executes the instructions.

The HDD 205 is an external storage device and stores the OS and various programs.

A network interface (I/F) 206 is connected to the CPU 202, the ROM 203, the RAM 204, and the HDD 205 via the internal bus 201 for inputting and outputting information to and from the information processing apparatus 200 via a network such as the LAN 101.

Hereinafter, unless otherwise specified, the main constituent of hardware such as the computer server and devices is the CPU 202, and the main constituent of software is an application program installed in the HDD 205.

Figure 3:
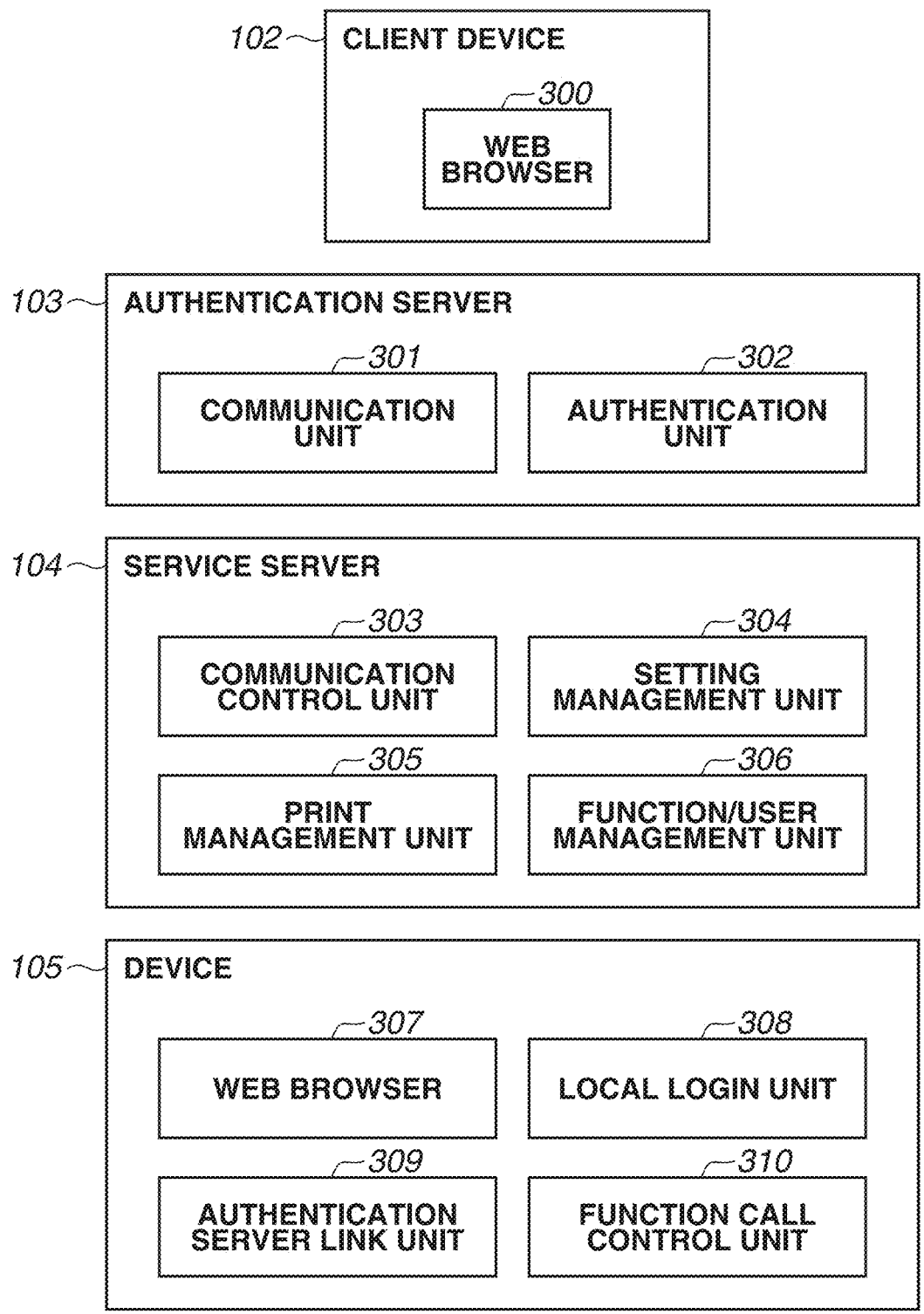
FIG. 3 is a function block diagram of each device of an information processing system and a client device according to an exemplary embodiment.

The functions of the client device 102, the authentication server 103, the service server 104, and the device 105 will be described below with reference to FIG. 3. The CPU 202 of each device in the information processing system 107 in the exemplary embodiments including the web browser 300 of the client device 102 executes the application program loaded into the RAM 204 to realize the function of the device. Among the functions, especially the function or function group realized on the server computer such as the authentication server 103 or the service server 104 is referred to as "cloud service".

The client device 102 includes the web browser 300, and the web browser 300 performs communication with the authentication server 103 and the service server 104. The web browser 300 is a function realized by a user agent for using a world wide web (WWW), and a web browser 307 is similar to the web browser 300. Specifically, information input to the web browser 300 is information about the functions of the device 105 and local user authentication information such as local user universally unique identifiers (UUIDs), and details thereof will be described below.

The authentication server 103 includes a communication unit 301 and an authentication unit 302. The authentication unit 302 is a function of communicating with the client device 102, the service server 104, and the device 105 via the communication unit 301.

The service server 104 includes a communication control unit 303, a setting management unit 304, a print management unit 305, and a function/user management unit 306. The communication control unit 303 is the function of accepting subscribe messages and distributing publish messages in MQTT. Further, the setting management unit 304 is a function of accepting via the communication control unit 303 requests via the setting screen of the client device 102 and managing setting information for displaying an execution result screen on the client device 102. The print management unit 305 accepts print requests from a function call control unit 310 and manages print information for displaying a print screen on the web browser 300. The function/user management unit 306 manages the local user authentication information, functions, and the like usable by currently-logged-in cloud users and receives requests and returns responses to the received requests, and the like via the communication control unit 303. Further, the function/user management unit 306 also includes the function of generating a screen to be displayed on the web browser 300 and transmitting the generated screen to the web browser 300. Table 1 illustrates an example of a table managed in the function/user management unit 306.

TABLE 1

| Device Identification Information | Local User UUID | Usable Function |
|---|---|---|
| 00001 | AAA1 | Print |
| 00001 | AAA1 | Setting Value Change |
| 00001 | AAA1 | Firmware Update |
| 00001 | AAA2 | Print |
| 00001 | AAA2 | Firmware Update |

The device identification information is information based on which the device 105 is uniquely identified. While the device identification information is in the form of a certificate in the exemplary embodiments described below, the device identification information may be in any form such as a form of a certificate or a form of a numerical character sequence based on which the authentication unit 302 can uniquely identify the device 105.

Further, the local user UUID is information for uniquely identifying the local user, and details thereof will be described below. In the example illustrated in Table 1, the user is allowed to use the "print", "setting value change", and "firmware update" functions using the local user UUID "AAA1". Table 1 is an example of the table managed in the function/user management unit 306, and the table may be in a form other than the form of Table 1 in which each local user UUID is linked with a function usable by the local user UUID.

The device 105 includes the web browser 307, a local login unit 308, an authentication server link unit 309, and the function call control unit 310. The web browser 307 is a function of communicating with the authentication server 103 and the service server 104. The local login unit 308 is a function of authenticating a local user who is the user of the device 105. The local login unit 308 can be configured to communicate with an authentication server (not illustrated) to authenticate the local users.

The authentication server link unit 309 makes an authentication link information issue request. Further, the authentication server link unit 309 is also the function of associating cloud user authentication information, which is information for uniquely identifying the cloud user who is the user of the cloud system 106, with the local user authentication information, which is information for uniquely identifying the local user.

The authentication link information is authentication information used to associate the cloud user authentication information with the local user authentication information. Examples of authentication link information include passcodes. The cloud user authentication information is a general term for authentication information which is generated when the cloud user logs in to the cloud system 106, and the cloud user authentication information contains information for uniquely identifying the cloud user, such as a cloud user ID or cloud user UUID. UUID is an identifier for uniquely identifying a user and, unlike IDs, UUID is generated not to overlap with other users. As a result, every piece of user information set for each tenant in a multi-tenant system is identifiable using the cloud user UUID. While the cloud user authentication information is in the form of a token in examples described below, the cloud user authentication information may be in any form of information based on which a cloud user is identifiable. On the other hand, the local user authentication information is a general term for authentication information generated when a local user logs in to the device 105, and the local user authentication information contains information for uniquely identifying the local user, such as the local user ID or local user UUID. While the local user authentication information is in the form of a token in the examples described below, the local user authentication information may be in any form of information based on which the local user is identifiable. Examples in which association information that associates the cloud user UUID with the local user UUID using the authentication link information will be described below.

The function call control unit 310 transmits a subscribe message to the service server 104 and waits for a processing request from the service server 104 in the user association processing of associating the cloud user UUID with the local user UUID described below.

A process of authenticating the device 105 by the authentication server 103 will be described below with reference to FIG. 4. The process is started at a timing when the authentication server link unit 309 is activated for the first time after being installed into the device 105. The communication unit 301 of the authentication server 103 is configured to require authentication of the device 105.

In step S1.1, the authentication server link unit 309 transmits a device registration request to the communication unit 301. More specifically, the communication unit 301 that has received the device registration request from the authentication server link unit 309 starts a negotiation through secure socket layer/transport layer security (SSL/TLS) communication. At this time, the communication unit 301 transmits a device authentication information request to the authentication server link unit 309 and receives device authentication information. The device authentication information is a certificate used in SSL/TLS communication to identify the device 105. In step S1.2, the communication unit 301 verifies, using a certificate set in a certificate store (not illustrated), the device authentication information acquired in step S1.1 and authenticates the authentication server link unit 309 as a source of the request for registering the device 105. In step S1.3, the communication unit 301 transmits to the authentication unit 302 the device registration request and the device authentication information received from the authentication server link unit 309. In step S1.4, the authentication unit 302 issues device identification information for uniquely identifying the device 105 based on the device authentication information acquired in step S1.3. In step S1.5, the authentication unit 302 transmits, to the authentication server link unit 309 via the communication unit 301, the device identification information in response to the device registration request.

These are the descriptions about the processes of authentication of the device 105 by the authentication server 103. Using the device identification information issued by the authentication unit 302 in the process, the authentication server link unit 309 is able to identify the device 105. Further, while the previous setting of the present exemplary embodiment is the registration processing of registering the authentication server link unit 309 in the authentication unit 302, the previous setting is not necessarily limited to the processing. For example, the device identification information issued by the authentication unit 302 may manually be registered in the authentication server link unit 309. Further, device authentication information embedded in the authentication server link unit 309 at the time of shipment may be used directly. Further, "communication from an external device to the authentication unit 302 via the communication unit 301" will be referred to as "external communication to the authentication unit 302" in the exemplary embodiments described below.

In a case in which the device 105 is a multi-user device, a plurality of cloud users UUIDs is allowed to be associated with one local user UUID. A first exemplary embodiment will be described in which the cloud system 106 identifies an execution result corresponds to which cloud user UUID and the request and the response are associated with each other. A process of issuing authentication link information for associating a cloud user UUID managed by the authentication unit 302 with a local user UUID managed by the local login unit 308 in a state in which the process of registering the device 105 is completed (FIG. 4) will be described below with reference to FIG. 5.

In step S2.1, the local login unit 308 accepts user login processing using an authentication method specified in the local login unit 308. Examples of an authentication method include a method of verifying a combination of a user ID and a password, a method of verifying biological information such as fingerprints, a method using a contactless integrated circuit (IC) card, and a multi-element authentication method, which is a combination of a plurality of authentication methods. Further, the local login unit 308 can communicate with an authentication server (not illustrated) to authenticate the user. In the first exemplary embodiment, the case of using the authentication method of verifying a combination of a local user ID and a password will be described as an example. Table 2 illustrates an example of user information managed by the local login unit 308.

TABLE 2

| Local User ID | Local User UUID | Password | Authorization Information |
|---|---|---|---|
| admin | AAA1 | admin | Administrator |
| user | AAA2 | user | General |

In step S2.2, the local login unit 308 performs local user authentication using the combination of the local user ID and the password. More specifically, the local login unit 308 performs local user authentication by referring to the user information in Table 1. For example, if the user inputs the local user ID "admin" and the password "admin", the local login unit 308 authenticates the user as the local user of the local user ID "admin".

In step S2.3, the local login unit 308 generates and saves the local user authentication information about the user authenticated in step S2.2. The local user authentication information is saved in an effective state until the user performs a logout operation (not illustrated) or until a set time elapses. The local user authentication information stores the local user ID and the local user UUID of the authenticated user, authority information about the authenticated user, and the like. More specifically, the local user authentication information contains nearly the same information as the user information indicated in Table 1. The form is not limited to the form in which the local login unit 308 directly stores the local user authentication information. In an alternative form, for example, the local login unit 308 stores a token associated with the local user authentication information and the token is referred to use the local user authentication information stored in a different location from the local login unit 308.

In step S2.4, the web browser 307 accepts an authentication link information issue request by a user operation. In step S2.5, the web browser 307 transmits to the authentication server link unit 309 an authentication link information issue request in response to the received issue request. In step S2.6, the authentication server link unit 309 transmits to the local login unit 308 a local user UUID acquisition request. In step S2.7, the local login unit 308 transmits the local user UUID to the authentication server link unit 309 in response to the request in step S2.6. In step S2.8, the authentication server link unit 309 transmits an authentication link information issue request to the authentication unit 302. At this time, the local user UUID received in step S2.7 and the device identification information received in step S1.5 are transmitted to the authentication unit 302.

In step S2.9, the authentication unit 302 issues authentication link information. Table 3 illustrates an example of a table of the authentication link information issued at this time and the expiration date. While the authentication link information is a character string in the first exemplary embodiment, the authentication link information may be information in the form of a Quick Response (QR) Code®, and the like as described below. Further, while the expiration date is set with respect to the authentication link information in the first exemplary embodiment, the authentication link information can be authentication link information of an indefinite period.

TABLE 3

| Authentication Link Information | Expiration Date |
|---|---|
| XXX-YYY-ZZZ | 2016 Dec. 06 08:00:00 |

In step S2.10, the authentication unit 302 manages the authentication link information issued in step S2.9 and the local user UUID and the device identification information received in step S2.8 in association with each other. Table 4 illustrates an example of association information.

TABLE 4

| Device Identification Information | Local User UUID | Authentication Link Information |
|---|---|---|
| 00001 | AAA1 | XXX-YYY-ZZZ |

In step S2.11, the authentication unit 302 responds to the authentication server link unit 309 with the authentication link information. In step S2.12, the authentication server link unit 309 executes association processing to associate the local user UUID and the authentication link information received in step S2.11. Table 5 illustrates an example of a mapping table generated at that time.

TABLE 5

| Local User UUID | Authentication Link Information |
|---|---|
| AAA1 | XXX-YYY-ZZZ |

In step S2.13, the authentication server link unit 309 transmits to the web browser 307 a response to the authentication link information issue request in step S2.5. More specifically, the authentication link information transmitted as a response in step S2.11 is transmitted to the web browser 307, and the web browser 307 displays the authentication link information. In this way, the user acquires the authentication link information. In step S2.14, the authentication server link unit 309 requests the function call control unit 310 to transmit a subscribe message to the communication control unit 303 for user association processing described below. In step S2.15, the function call control unit 310 transmits the subscribe message to the communication control unit 303. The topic in the transmission of the subscribe message is the device identification information. More specifically, the topic has a hierarchical structure segmented by "/" (e.g., /A/BC/D/E), and the subscriber can define the category of information that the subscriber desires to receive, so that the destination of the message is designated by specifying, for example, "(location of the device 105)/ (device identification information)". In this way, the function call control unit 310 can receive the publish message with the device identification information about the device 105 being the topic. Further, each time the function call control unit 310 detects a disconnection of communication, the function call control unit 310 transmits a subscribe message to the communication control unit 303 in order to maintain the communication with the communication control unit 303.

These are the descriptions about the processes of issuing authentication link information. In this way, the authentication server 103 and the device 105 can possess the mapping tables (Table 4, Table 5) using the authentication link information. Further, the user also can acquire the authentication link information. To issue a plurality of pieces of authentication link information, the sequence illustrated in FIG. 5 needs to be repeated. Table 6 illustrates an example of a mapping generated as a result of repeating the sequence twice in the authentication server link unit 309.

TABLE 6

| Local User UUID | Authentication Link Information |
|---|---|
| AAA1 | XXX-YYY-ZZZ |
| AAA2 | AAA-BBB-CCC |

Next, the user association processing of associating the local user UUID with the cloud user UUID in the authentication server 103 will be described below with reference to FIG. 6. In step S3.1, the web browser 300 accepts a login operation from the user. In step S3.2, the web browser 300 transmits to the authentication unit 302 a request for login processing. The login processing is executed by an authentication method specified in the authentication unit 302. Examples of an authentication method include a method of verifying a combination of a user ID and a password. In the first exemplary embodiment, the combination of the cloud user ID and the password will be described as an example. Table 7 illustrates an example of user information managed by the authentication unit 302.

TABLE 7

| Cloud User ID | Cloud User UUID | Password |
|---|---|---|
| se001 | CCC1 | se001 |
| se002 | CCC2 | se002 |

In step S3.3, the authentication unit 302 performs cloud user authentication. In step S3.4, the authentication unit 302 generates and saves cloud user authentication information about the authenticated cloud user. The cloud user authentication information is saved in an effective state until the user performs a logout operation (not illustrated) or until a set time elapses. The cloud user authentication information stores the cloud user ID and the cloud user UUID of the authenticated cloud user. As a result, the cloud user authentication information contains nearly the same user information as the user information specified in Table 7. The form is not limited to the form in which the authentication unit 302 directly stores the pieces of authentication information. In an alternative form, for example, the authentication unit 302 stores a token which is preferably-associated with the authentication information, and the authentication unit 302 refers to the token to use the authentication information stored in a different location from the authentication unit 302.

In step S3.5, the authentication unit 302 transmits to the web browser 300 a response to the login processing. At this time, a session ID associated with the cloud user UUID generated in step S3.4 is transmitted to the web browser 300. The session ID is an identifier for identifying a logged-in user. In the present exemplary embodiment, the session ID is managed by the authentication unit 302 in association with the cloud user UUID generated in step S3.4. In step S3.5, the web browser 300 receives the session ID to manage the session ID in the cookies (not illustrated) of the web browser 300. Unless otherwise specified, the session ID is transmitted and received in the communication between the web browser 300 and the authentication unit 302 in the exemplary embodiments described below.

In step S3.6, an authentication link information input request from the user is accepted. In step S3.7, the web browser 300 transmits the authentication link information input request to the authentication unit 302. In step S3.8, the authentication unit 302 transmits an input screen in response to the authentication link information input request from the web browser 300. In step S3.9, the web browser 300 accepts an authentication link information input operation from the user. In step S3.10, the web browser 300 transmits to the authentication unit 302 the received authentication link information and a request for association processing using the authentication link information. More specifically, the authentication link information "XXX-YYY-ZZZ" is input to the input screen of the web browser 300. In step S3.11, the authentication unit 302 associates the authentication link information received in step S3.10 with the cloud user UUID managed by the authentication unit 302. More specifically, the session ID managed by the authentication unit 302 is compared with the session ID received from the web browser 300 in step S3.10, and the cloud user UUID is associated with the authentication link information via the session ID. Table 8 illustrates an example of association information generated at this time.

TABLE 8

| Session ID | Cloud User UUID | Authentication Link Information |
|---|---|---|
| 1 | CCC1 | XXX-YYY-ZZZ |

In step S3.12, the authentication unit 302 combines the mapping table (Table 4) generated in step S2.10 and the mapping table (Table 8) generated in step S3.11 into a single mapping table and associates the local user UUID with the cloud user UUID. More specifically, Tables 4 and 8 contain common authentication link information, so that the local user UUID is associated with the cloud user UUID via the common authentication link information. Table 9 illustrates an example of association information generated at this time.

TABLE 9

| Session ID | Device Identification Information | Local User UUID | Cloud User UUID |
|---|---|---|---|
| 1 | 00001 | AAA1 | CCC1 |

In step S3.13, the authentication unit 302 transmits, to the function/user management unit 306 via the communication control unit 303, the association information that associates the cloud user UUID, the local user UUID, and the session ID.

In step S3.14, the function/user management unit 306 performs association processing to associate the cloud user UUID, the local user UUID, and the usable function. More specifically, the association information (Table 9) generated in step S3.12 and the information (Table 1) managed in the function/user management unit 306 contain a common local user UUID, so that the cloud user UUID, the local user UUID, and the usable function are associated with each other via the common local user UUID. Table 10 illustrates an example of a table generated at this time. Table 10 is a mere example, and the table can be in any form based on which the local user UUID, the cloud user UUID, and the usable function are associated with each other. Further, although not illustrated in Table 10, the cloud user UUID is associated with the session ID received by the function/user management unit 306 in step S3.13. The same applies to Tables 11 and 12 described below.

TABLE 10

| Device Identification Information | Local User UUID | Cloud User UUID | Usable Function |
|---|---|---|---|
| 00001 | AAA1 | CCC1 | Print |
| 00001 | AAA1 | CCC1 | Setting ValueChange |
| 00001 | AAA1 | CCC1 | Firmware Update |

Further, the sequence of steps S3.6 to S3.14 (FIG. 6) needs to be repeated to associate a plurality of local user UUIDs with the cloud user UUID in the authentication server 103. Table 11 illustrates an example of a mapping generated in the authentication unit 302 as a result of repeating the sequence, and Table 12 illustrates an example of a mapping generated in the function/user management unit 306 as a result of repeating the sequence.

TABLE 11

| Device Identification Information | Local User UUID | Cloud User UUID |
|---|---|---|
| 00001 | AAA1 | CCC1 |
| 00001 | AAA2 | CCC1 |

TABLE 12

| Device Identification Information | Local User UUID | Cloud User UUID | Usable Function |
|---|---|---|---|
| 00001 | AAA1 | CCC1 | Print |
| 00001 | AAA1 | CCC1 | Setting Value Change |
| 00001 | AAA1 | CCC1 | Firmware Update |
| 00001 | AAA2 | CCC1 | Print |
| 00001 | AAA2 | CCC1 | Firmware Update |

These are the descriptions about association processing of associating the local user UUID and the cloud user UUID with each other in the authentication server 103. At the time of generating a mapping table as illustrated in Tables 9 to 12, if the authentication link information expires and is no longer valid, the mapping table is unsuccessfully generated, and the user association processing is ended. At this time, a notification of the failure of mapping table generation may be transmitted to the web browser 300.

Next, the user association processing of associating the local user UUID and the cloud user UUID with each other in the device 105 will be described below with reference to FIG. 7. In step S4.1, the authentication unit 302 transmits to the communication control unit 303 a publish message together with a request for association of the authentication link information input in step S3.9 with the cloud user UUID. The topic at the time of transmitting the publish message is the device identification information. In this way, the publish message of the same topic as the topic of the subscribe message transmitted from the function call control unit 310 to the communication control unit 303 in step S2.15 can be transmitted. The message to be transmitted by the authentication unit 302 does not have to be a MQTT publish message if the communication control unit 303 includes a function of conversion between MQTT and a different protocol.

In step S4.2, the publish message as a cloud user UUID association request is transmitted to the function call control unit 310 having transmitted the subscribe message. At this time, the cloud user UUID and the authentication link information are also transmitted at the same time. In step S4.3, the function call control unit 310 transmits a cloud user UUID association request to the authentication server link unit 309. At this time, a notification of the authentication link information and the cloud user UUID received in step S4.2 is also transmitted at the same time. In step S4.4, the authentication server link unit 309 performs association processing to associate the local user UUID and the cloud user UUID with each other using the cloud user UUID and the authentication link information received in step S4.3. Since the authentication server link unit 309 manages the association information about the association between the local user UUID and the authentication link information (step S2.12), the local user UUID and the cloud user UUID can be associated with each other via the authentication link information. The sequence illustrated in FIG. 7 is repeated a plurality of times to associate a plurality of local user UUIDs with the cloud user UUID in the device 105. Table 13 illustrates an example of association information generated at this time.

TABLE 13

| Local User UUID | Cloud User UUID |
|---|---|
| AAA1 | CCC1 |
| AAA2 | CCC1 |

These are the descriptions about the user association processing of associating the local user UUID and the cloud user UUID with each other in the device 105. The user association processing in FIG. 6 associates the local user UUID and the cloud user UUID with each other in the authentication server 103, and the user association processing in FIG. 7 associates the local user UUID and the cloud user UUID with each other in the device 105.

Next, the function call processing in the device 105 will be described below with reference to FIG. 8. The steps that are already described in the first exemplary embodiment are given the same step numbers, and description thereof is omitted. In step S5.1, the web browser 300 accepts an operation of requesting a function usable by the currently-logged-in cloud user. In step S5.2, the web browser 300 transmits a usable function request to the function/user management unit 306 according to the user operation accepted in step S5.1.

Figure 9A:
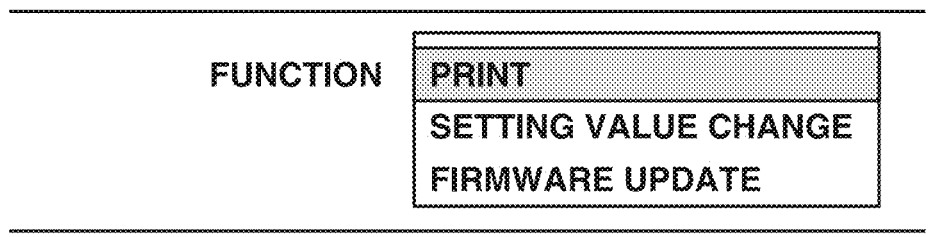
FIGS. 9A, 9B, and 9C are image diagrams each illustrating a display screen of a web browser according to the first exemplary embodiment.
Figure 9B:
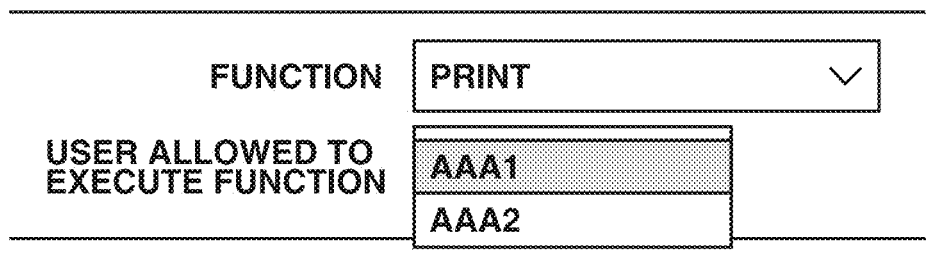
Figure 9C:
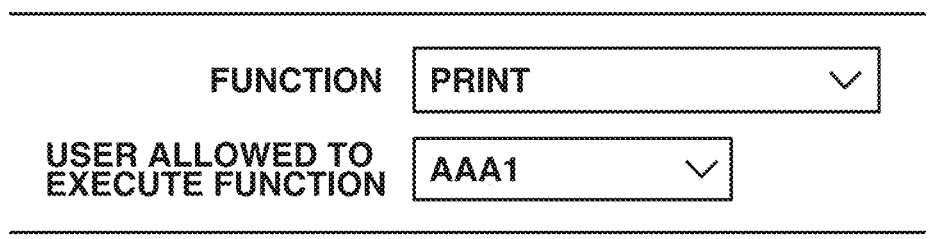

In step S5.3, the function/user management unit 306 responds to the web browser 300 with usable functions. More specifically, the function/user management unit 306 refers to Table 12 and transmits to the web browser 300 the usable functions associated with the session ID transmitted in step S5.2. The session ID and the cloud user UUID are associated with each other in the function/user management unit 306 (step S3.14), so that if the web browser 300 transmits the session ID to the function/user management unit 306 in step S5.2, the cloud user UUID associated with the session ID is identified from Table 12. Further, the usable functions associated with the cloud user UUID are identified from Table 12, and the identified usable functions are transmitted to the web browser 300. FIG. 9A illustrates an example of a display screen when the web browser 300 displays the usable functions. In FIG. 9A, the three functions "print", "setting value change", and "firmware update" are displayed as usable functions. While the display screens illustrated in FIGS. 9A, 9B, and 9C are generated by the function/user management unit 306 in the present exemplary embodiment, the display screen of the web browser 300 may be generated at anywhere in the service server 104 or the authentication server 103. The same applies to display screens described below (FIGS. 10A, 10B, 12, 14A, 14B, 14C, 16A, 16B, 16C, 17, 19A, 19B, and 19C).

In step S5.4, the web browser 300 accepts a function selection operation through a user operation. FIG. 9A illustrates a state in which the "print" function is selected by the user. In step S5.5, the web browser 300 transmits a usable local user UUID request to the function/user management unit 306.

In step S5.6, the function/user management unit 306 responds to the web browser 300 with the local user UUID usable by the logged-in cloud user based on the session ID received in step S5.5 and the association information (Table 12) managed in the function/user management unit 306. More specifically, since the session ID and the cloud user UUID are associated with each other in the function/user management unit 306 (step S3.14), if the web browser 300 transmits the session ID to the function/user management unit 306 in step S5.5, the cloud user UUID associated with the session ID is identified with reference to Table 12. Further, the local user UUID associated with the cloud user UUID is identified from Table 12, and the identified local user UUID is transmitted to the web browser 300. FIG. 9B illustrates an example of the display screen at this time. In FIG. 9B, "AAA1" and "AAA2" are displayed as usable local user UUIDs. If the screen is selected by a user operation, step S5.8 described below is started.

In step S5.7, the web browser 300 accepts a local user selection operation from the user. FIG. 9C illustrates a state in which the local user UUID "AAA1" is selected by the user. In step S5.8, an execution request for executing the function of the device 105 that is selected in step S5.4 is transmitted from the web browser 300 to the function/user management unit 306 using the local user UUID selected in step S5.7. At this time, the local user UUID and the device identification information are also transmitted to the function/user management unit 306. If the messaging protocol between the web browser 300 and the service server 104 at this time is the Hypertext Transfer Protocol (HTTP), the execution request transmitted from the web browser 300 in step S5.8 is a request message according to the HTTP method. The same applies to the communication between the web browser 300 and the service server 104 hereinafter.

In step S5.9, the local user UUID, the device identification information, and the execution request received in step S5.8 are transmitted from the function/user management unit 306 to the print management unit 305. More specifically, the request message received as the execution request in step S5.8 is transmitted to the print management unit 305.

In step S5.10, the print management unit 305 transmits to the communication control unit 303 the local user UUID, the device identification information, and the execution request received in step S5.9. Since the case in which the service server 104 is the server to perform MQTT messaging is described herein as an example, the execution request is transmitted as the publish message from the print management unit 305 to the communication control unit 303.

In step S5.13, the communication control unit 303 transmits to the function call control unit 310 a request for executing the function selected in step S5.4. At this time, the local user UUID acquired in step S5.10 is transmitted together. Since the case in which the service server 104 is the server to perform MQTT messaging is described herein as an example, the execution request is transmitted as the publish message to the function call control unit 310. The topic at this time is the device identification information. Further, since the "print" function is selected in step S5.4, the execution request transmitted in step S5.13 is an execution request for realizing the print function.

In step S5.14, the function call control unit 310 executes the execution request received as the publish message. At this time, the function is executed as the local user identified from the local user UUID selected in step S5.7. For example, the local user UUID "AAA1" is selected in FIG. 9C, so that the function is executed as the local user ID "admin" based on the user table (Table 2) held by the device 105. In step S5.15, the function call control unit 310 transmits to the authentication server link unit 309 an acquisition request for the cloud user UUID associated with the local user UUID received in step S5.13. In step S5.16, the authentication server link unit 309 responds to the function call control unit 310 with the cloud user UUID corresponding to the acquisition request. In step S5.17, the function call control unit 310 responds to the communication control unit 303 with an execution result. At this time, the cloud user UUID acquired in step S5.16 is also transmitted.

In step S5.18, the communication control unit 303 responds to the print management unit 305 with the execution result. Using the cloud user UUID received in step S5.17, the print management unit 305 is able to identify the cloud user that has transmitted the execution request in response to which the result is transmitted. Further, the print management unit 305 acquires from the authentication unit 302 the local user UUID associated with the cloud user UUID to thereby identify the local user that has transmitted the execution request in response to which the result is transmitted. The execution result and the local user UUID and the cloud user UUID used in the execution are eventually managed by the print management unit 305 or a database (not illustrated). At this time, each execution result is associated with the session ID and the identifier for uniquely identifying the execution result and managed in the print management unit 305.

These are the descriptions about the function call processing in the device 105. In this way, the user can use an open function of the device 105 as an executable user via the client device 102 and also can check a result of the execution.

After the execution of the function of the device 105, the web browser 300 of the client device 102 can accept a request for an execution result screen (not illustrated) from the user and display the execution result screen. FIG. 10A illustrates an example of the execution result screen. In FIG. 10A, the device name, the time/date of execution of the function of the device, and the selected local user UUID are displayed. While "manual" is displayed in the section "user selection", the field of "user selection" can be omitted in the present exemplary embodiment.

Figure 11:
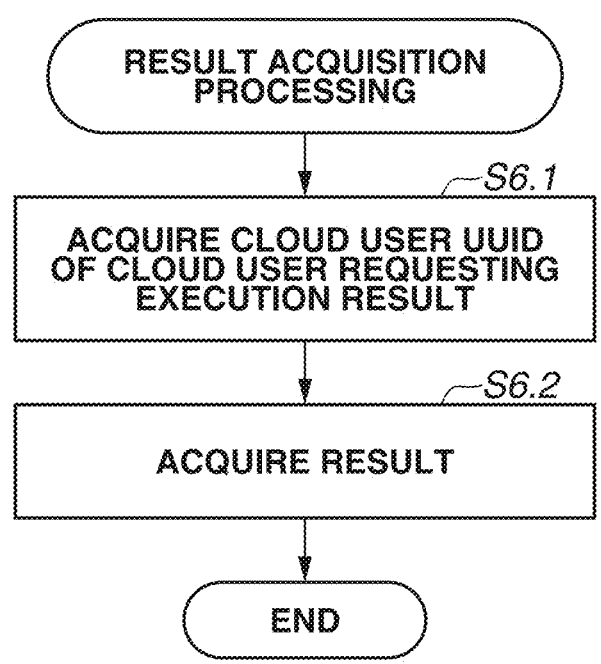
FIG. 11 is a flowchart illustrating result acquisition processing according to an exemplary embodiment.

Further, FIG. 11 is a flowchart illustrating result acquisition processing for displaying the execution result screen (FIG. 10A). The flowchart is started when the user requests executing the function of the device 105. In step S6.1, the function/user management unit 306 acquires from the authentication unit 302 the cloud user UUID of the cloud user requesting the execution result screen. In step S6.2, the function/user management unit 306 acquires an execution result from the print management unit 305 storing information about execution results by the device 105 or a database (not illustrated) using the local user UUID and the device identification information acquired in step S5.8. These are the descriptions about the result acquisition processing. In this way, the function of the device 105 is selected by the user, and the local user UUID allowed to use the function is displayed to improve the convenience in the execution of the device functions using the plurality of local user accounts via the cloud system.

In the first exemplary embodiment, the form in which the web browser 300 displays the usable functions and further displays the local user UUIDs allowed to use the functions selected from the usable functions is described. In a second exemplary embodiment, another form will be described below in which the web browser 300 displays the usable local user UUIDs and a function executable by the local user UUID selected from the displayed local user UUIDs is selected. The authentication link information issue processing and the user association processing in the second exemplary embodiment are similar to those in the first exemplary embodiment, so that description thereof is omitted.

Figure 13:
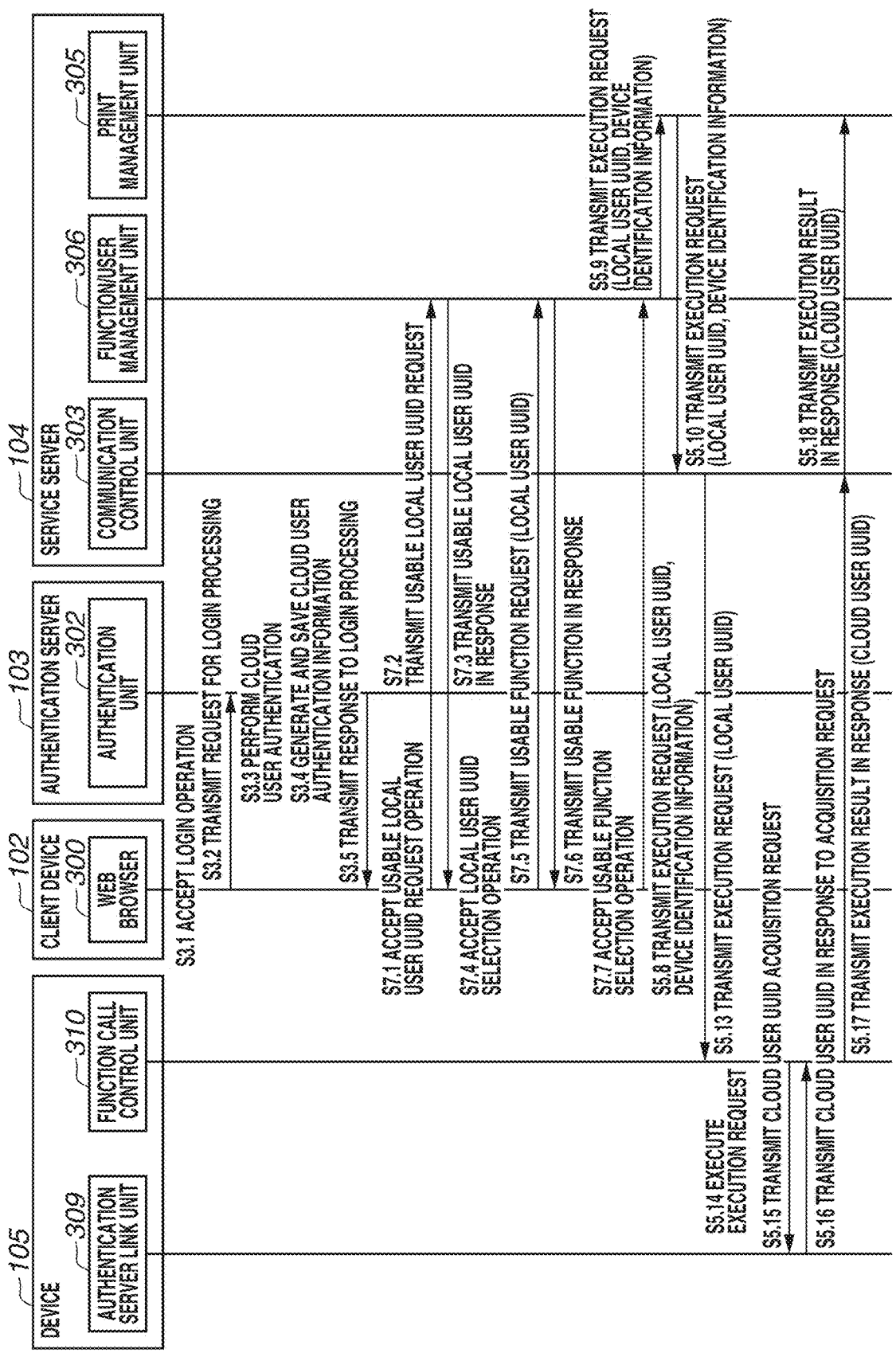
FIG. 13 is a sequence diagram illustrating function call processing in the device according to an exemplary embodiment.

The function call processing in the second exemplary embodiment will be described below with reference to FIG. 13. Similar steps to those in the first exemplary embodiment (FIG. 8) are given the same reference numerals, and detailed description thereof is omitted. In step S7.1, the web browser 300 accepts a usable local user UUID request operation through a user operation. In step S7.2, the web browser 300 transmits to the function/user management unit 306 a request for usable local user UUIDs.

Figure 14A:
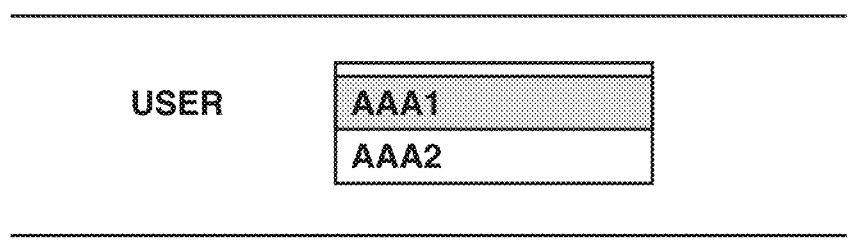
FIGS. 14A, 14B, and 14C are image diagrams each illustrating a display screen of a web browser according to a second exemplary embodiment.
Figure 14B:
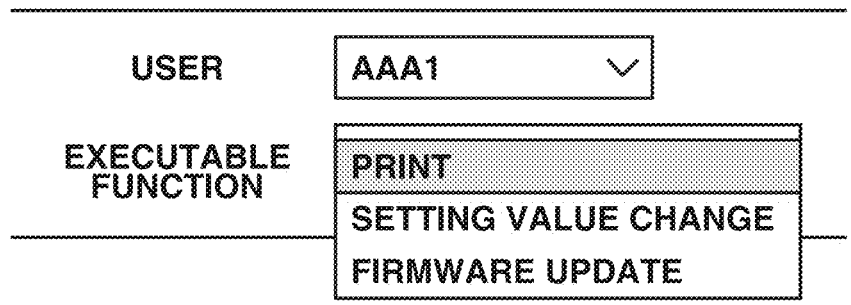

In step S7.3, the function/user management unit 306 responds to the web browser 300 with the usable local user UUIDs. More specifically, since the session ID and the cloud user UUID are associated with each other in the function/user management unit 306 (step S3.14), if the web browser 300 transmits the session ID to the function/user management unit 306 in step S7.2, the cloud user UUID associated with the session ID is identified using Table 12. Further, the local user UUID associated with the cloud user UUID is identified from Table 12, and the identified local user UUID is transmitted to the web browser 300. At this time, the function/user management unit 306 refers to Table 12 and transmits as a response the local user UUID associated with the session ID received in step S7.2. FIG. 14A illustrates an example of the display screen when the web browser 300 displays the usable local user UUIDs. In FIG. 14A, "AAA1" and "AAA2" are displayed as usable local user UUIDs. In step S7.4, the web browser 300 accepts a local user UUID selection operation from the user. FIG. 14B illustrates an example of a state in which the local user UUID is selected on the web browser 300 by the user. In the example, "AAA1" is selected.

In step S7.5, the web browser 300 transmits a usable function request to the function/user management unit 306. At this time, the local user UUID selected in step S7.4 is transmitted together. In step S7.6, the function/user management unit 306 responds to the web browser 300 with the usable functions. More specifically, the function/user management unit 306 refers to Table 12 and transmits as a response the usable functions associated with the received local user UUID and the received session ID based on the local user UUID and the session ID received in step S7.5. FIG. 14B illustrates an example in which the usable functions are displayed on the web browser 300. In FIG. 14B, "print", "setting value change", and "firmware update" are displayed as the functions selectable by the user.

Figure 14C:
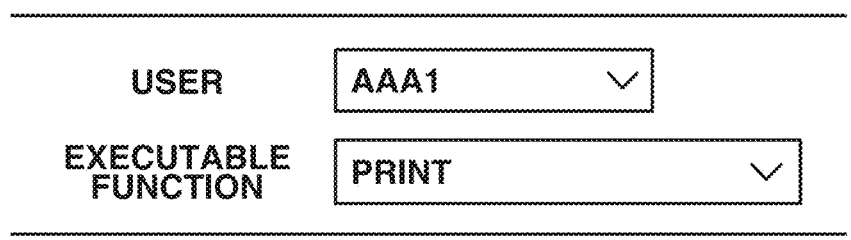

In step S7.7, the web browser 300 accepts a usable function selection operation from the user. FIG. 14C illustrates an example of a state in which a function is selected on the web browser 300 by the user. In FIG. 14C, the "print" function is selected.

In step S5.8, the selection of the usable function by the user in step S7.7 causes an execution request to be transmitted from the web browser 300 to the function/user management unit 306. In step S5.9, the transmitted execution request is transmitted from the function/user management unit 306 to the print management unit 305. In step S5.10, the print management unit 305 transmits the execution request to the communication control unit 303. In step S5.13, the communication control unit 303 transmits the execution request received in step S5.10. In step S5.14, the function call control unit 310 executes the selected function according to the contents of the execution request received in step S5.13. In step S5.15, after executing the selected function, the function call control unit 310 transmits a cloud user UUID acquisition request to the authentication server link unit 309. In step S5.16, the authentication server link unit 309 responds to the function call control unit 310 with the cloud user UUID for which the acquisition request is received. In step S5.17, the function call control unit 310 responds to the communication control unit 303 with an execution result. In step S5.18, the communication control unit 303 transmits to the print management unit 305 the execution result transmitted as a response.

These are the descriptions about the function call processing in the second exemplary embodiment. In this way, the local user UUID is selected by the user, and the functions of the device 105 that are usable by the selected local user UUID are displayed to improve the convenience in the execution of the device functions using the plurality of local user accounts via the cloud system. Further, while the display order of the functions of the device 105 and the local user UUIDs differs between the first and second exemplary embodiments, the first and second exemplary embodiments can be used differently based on demands of the user. For example, in a case in which the user wishes to prioritize the desired function of the device 105 and select the local user UUID with respect to the desired function, it is suitable to use the first exemplary embodiment. On the other hand, in a case in which the user wishes to use only the function of the device 105 that is usable by a specific local user UUID, it is suitable to use the second exemplary embodiment.

In a third exemplary embodiment, another form will be described in which the usable local user UUID is automatically selected based on the function selected on the web browser 300 by the user and the function is executed using the selected local user UUID. The authentication link information issue processing and the user association processing in the third exemplary embodiment are similar to those in the first exemplary embodiment, so that description thereof is omitted.

The function call processing in the third exemplary embodiment will be described below with reference to FIG. 15. Similar steps to those in the first exemplary embodiment (FIG. 8) are given the same reference numerals, and detailed description thereof is omitted. In step S5.1, the web browser 300 accepts a usable function request operation from the user. In step S5.2, the web browser 300 transmits a usable function request to the function/user management unit 306. In step S5.3, the function/user management unit 306 responds to the web browser 300 with usable functions based on the session ID received in step S5.2. An example of the display screen when the web browser 300 displays the usable functions is as illustrated in FIG. 9A. In step S5.4, the web browser 300 accepts a function selection operation from the user. An example of a state in which the "print" function is selected by the user is as illustrated in FIG. 9A. In step S5.5, the web browser 300 transmits a usable local user UUID request to the function/user management unit 306.

In step S8.1, the function/user management unit 306 selects the local user UUID based on priority. In the function/user management unit 306, the priority of each local user UUID allowed to use a function of the device 105 is determined with respect to the functions of the device 105. Table 14 illustrates an example of data on the priority.

TABLE 14

| Device Identification Information | Usable Function | Local User UUID | Cloud User UUID | Priority |
|---|---|---|---|---|
| 00001 | Print | AAA1 | CCC1 | 1 |
| 00001 | Print | AAA2 | CCC1 | 2 |
| 00001 | Setting Value Change | AAA1 | CCC1 | 1 |
| 00001 | Firmware Update | AAA1 | CCC1 | 2 |
| 00001 | Firmware Update | AAA2 | CCC1 | 1 |

In step S8.1, a local user UUID with a high priority is selected based on Table 14. The priority is the order of preferential use of the function selected in step S5.4 by the local user UUIDs. The priority can be determined by any method, and examples of a possible method include a method of setting the priority according to the order in which each local user UUID is associated with the function and a method in which local users having administrator authority are prioritized. Further, the form is not limited to that illustrated in Table 14, and any form can be employed in which each local user UUID is associated with the priority. In the present case, the "print" function is selected in step S5.4, and the local user UUID allowed to use the "print" function preferentially is "AAA1" according to Table 14, so that AAA1 is selected in step S8.1.

In step S8.2, the function/user management unit 306 responds to the web browser 300 with the local user UUID. FIG. 16A illustrates an example of the display on the web browser 300 at this time. In FIG. 16A, the local user UUID "AAA1" selected based on the priority is automatically selected. By pressing an "execute function using AAA1" button, step S8.3 described below is executed. On the other hand, by pressing a "select different user" button, step S5.5 in FIG. 8 (first exemplary embodiment) is started to allow the user to manually select a local user UUID. The screen displayed at this time is as illustrated in FIG. 9B. The screen displayed on the web browser 300 in step S8.2 is not limited to the form illustrated in FIG. 16A. In an alternative form, for example, while the local user UUID "AAA1" is automatically selected as illustrated in FIG. 16B, the section "user allowed to execute function" can be pulled down to manually change the local user UUID as illustrated in FIGS. 16B and 16C.

In step S8.3, the web browser 300 accepts an execution start operation through a user operation. In this way, the execution request in step S5.8 is started without selection of a local user UUID by the user.

In step S5.8, an execution request is transmitted from the web browser 300 to the function/user management unit 306. In step S5.9, the execution request is transmitted from the function/user management unit 306 to the print management unit 305. In step S5.10, the print management unit 305 transmits the execution request to the communication control unit 303. In step S5.13, the communication control unit 303 transmits the execution request to the function call control unit 310. In step S5.14, the function call control unit 310 executes the transmitted execution request. In step S5.15, the function call control unit 310 transmits a cloud user UUID acquisition request to the authentication server link unit 309. In step S5.16, the authentication server link unit 309 responds to the function call control unit 310 with the cloud user UUID for which the acquisition request is received. In step S5.17, the function call control unit 310 transmits to the communication control unit 303 an execution result together with the cloud user UUID received in step S5.16. In step S5.18, the communication control unit 303 transmits the execution result to the print management unit 305.

These are the descriptions about the function call processing in the third exemplary embodiment. In this way, the user can use an open function of the device 105 as an executable user via the client device 102 and also can check a result of the execution. Further, since the usable local user UUID is automatically selected, the user can execute the usable function simply by selecting the function. Further, the automatic local user UUID selection method described in the third exemplary embodiment can be combined in the local user UUID selection in the first and second exemplary embodiments described above.

Further, the result acquisition processing (FIG. 11) and the execution result screen (FIG. 10A) are acquired by similar steps to those in the first exemplary embodiment, so that the description thereof is omitted. FIG. 17 illustrates an example of the execution result screen in the case of the third exemplary embodiment. In the case in which the local user UUID is manually selected as in the first exemplary embodiment, the section of "user selection" is displayed as "manual". On the other hand, in the case in which the local user UUID is automatically selected as in the third exemplary embodiment, the section of "user selection" is displayed as "automatic". Whether to select the local user UUID automatically or manually may be set in advance on an initial setting screen, an initial setting file, and the like.

There can be a use form in which when a function execution result of the device 105 is unsuccessful or when the execution is successful but re-execution of the same function is desired, the function is re-executed from the history of the execution result screen, and the like. The re-execution is a process in which the user selects an execution result from an execution history and transmits an execution request to the service server 104 using the same setting condition (information about the same local user UUID and the function of the device 105) as that of the selected execution result or information about the same function of the device 105 as the selected execution result.

Figure 18:
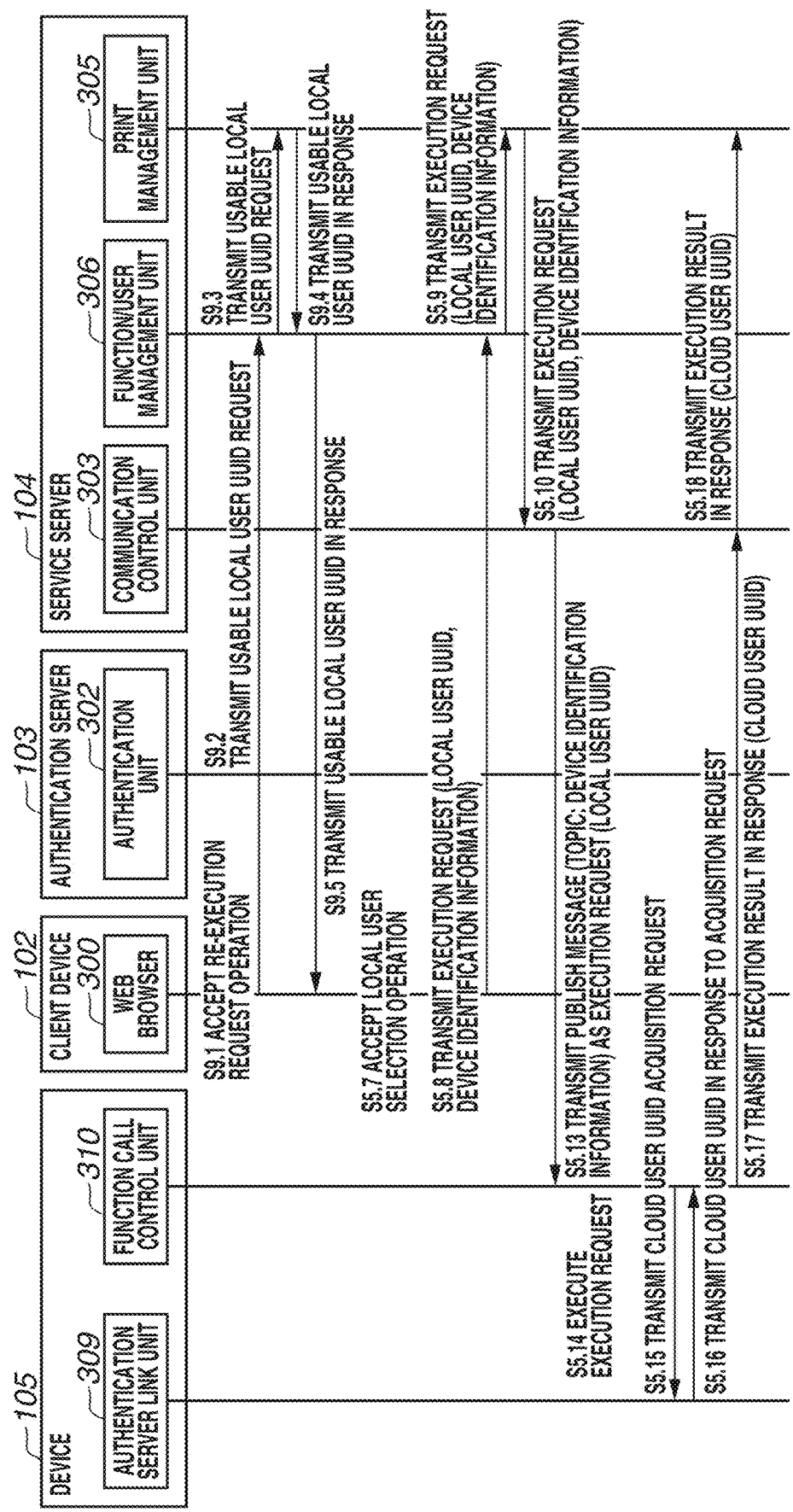
FIG. 18 is a sequence diagram illustrating re-execution processing according to a fourth exemplary embodiment.

In a fourth exemplary embodiment, processing performed in the re-execution will be described below with reference to FIG. 18. The authentication link information issue processing and the user association processing in the fourth exemplary embodiment are similar to those in the first exemplary embodiment, so that the description thereof is omitted.

Next, the function call processing in the re-execution will be described below with reference to FIG. 18. By pressing a "re-execute" button on the execution result screen (FIG. 10B), the process illustrated in FIG. 18 is started. In step S9.1, the web browser 300 accepts a re-execution request operation through a user operation. In step S9.2, the web browser 300 transmits a usable local user UUID request to the function/user management unit 306. At this time, the identifier for uniquely identifying the execution result selected to be re-executed in step S9.1 is also transmitted. The identifier for uniquely identifying the execution result (hereinafter, referred to as "execution result identifier") is an identifier issued with respect to the execution result at the time of saving the execution result in the print management unit 305. At the time of acquiring the execution result in step S6.2 in FIG. 11, the execution result identifier to be displayed on the execution result screen (FIGS. 10A, 10B, and 17) is identified, and the execution result identifier is transmitted to the web browser 300 together with the execution result screen. The execution result identifier received by the web browser 300 at this time is transmitted to the function/user management unit 306 in step S9.2.

In step S9.3, the function/user management unit 306 transmits to the print management unit 305 a usable local user UUID request together with the session ID and the execution result identifier received in step S9.2. In step S9.4, the print management unit 305 responds to the function/user management unit 306 with the usable local user UUID. At this time, the local user UUID associated with the session ID and the execution result identifier received in step S9.3 is transmitted to the function/user management unit 306.

In step S9.5, the function/user management unit 306 responds to the web browser 300 with the usable local user UUID received in step S9.4. An example of the consequently-acquired display on the web browser 300 is as illustrated in FIG. 9B. In FIG. 9B, if the local user UUID is selected, step S5.8 described below is started. FIG. 9C illustrates an example of the display on the web browser 300 that is consequently acquired when the user selects the local user UUID. In the current case, re-execution of the "print" function using the local user UUID "AAA1" is selected.

In step S5.7, the web browser 300 accepts a local user selection operation from the user. In step S5.8, the local user UUID selected in step S5.7 and the function execution result selected in step S9.1 are transmitted from the web browser 300 to the function/user management unit 306. In the current case, an execution request for executing the "print" function is transmitted as illustrated in FIG. 10B. In step S5.9, the local user UUID, the device identification information, and the execution request are transmitted from the function/user management unit 306 to the print management unit 305. In step S5.10, the print management unit 305 transmits to the communication control unit 303 the local user UUID, the device identification information, and the execution request received in step S5.9. In step S5.13, the communication control unit 303 transmits the execution request together with the local user UUID to the function call control unit 310. The execution request transmitted at this time is transmitted as a publish message to the function call control unit 310. In step S5.14, the function call control unit 310 executes the function according to the contents of the publish message received in step S5.13. At this time, the function is executed as the local user identified from the local user UUID selected in step S5.7. More specifically, since the local user UUID "AAA1" is selected in FIG. 9C, the print function is executed as the local user ID "admin" from the user table (Table 2) held by the device 105.

In step S5.15, the function call control unit 310 transmits to the authentication server link unit 309 an acquisition request for the cloud user UUID associated with the local user UUID received in step S5.13. In step S5.16, the authentication server link unit 309 responds to the function call control unit 310 with the cloud user UUID for which the acquisition request is received. In step S5.17, the function call control unit 310 responds to the communication control unit 303 with an execution result together with the cloud user UUID received in step S5.16. In step S5.18, the communication control unit 303 responds to the print management unit 305 with the execution result.

These are the descriptions about the processes of re-executing the function from the history of the execution result screen. In this way, the same function can be selected again from the history of the execution result screen without selecting the desired function again. Further, while the form in which the "re-execute" button is selected in the state in which the "print" function is "ended normally" and then the local user UUID is selected is described above with reference to FIG. 10B, the form is not limited to the above-described form. In an alternative form, for example, the "re-execute" button is pressed in the state in which the "print" function is "ended with error" as illustrated in FIG. 19B, and the same function is executed again.

As to the state in which the "print" function is "ended with error", there can be a case in which a "display details" button is pressed as illustrated in FIG. 19B and then "re-execution" is executed as illustrated in FIG. 19C. The processing in this case will be described below with reference to FIG. 20. FIG. 20 includes steps S10.1 to S10.3 prior to the process illustrated in FIG. 18. Description of step S9.1 and the subsequent steps which overlap FIG. 18 is omitted.

In step S10.1, the web browser 300 accepts a detailed display request operation through a user operation. FIG. 19B illustrates an example of the display on the web browser 300 at this time. The "detailed display" button in FIG. 19B is pressed by the user in step S10.1. In step S10.2, the web browser 300 transmits the detailed display request to the function/user management unit 306. At this time, an identifier for uniquely identifying the execution result for which the user selects the "display details" button in step S10.1 is also transmitted. In step S10.3, the function/user management unit 306 transmits to the print management unit 305 the detailed display request together with the session ID and the execution result identifier received in step S10.2. In step S10.4, the print management unit 305 responds to the function/user management unit 306 with the detailed display of the execution result associated with the received session ID and the received execution result identifier. In step S10.5, the function/user management unit 306 responds to the web browser 300 with the detailed display. FIG. 19C illustrates an example of the detailed display screen at this time. It is understood that the cause of the current error is that "printing is stopped due to a sheet jam". If the user presses the "re-execute" button in FIG. 19C, step S9.1 and the subsequent steps are started.

While the form in which the "re-execute" button is selected and the local user UUID is selected is described above, the form is not limited to the above-described form. In an alternative form, for example, the display screen illustrated in FIG. 9C is displayed as a result of selecting the "re-execute" button in FIG. 19B, so that re-selection of the usable function and the local user UUID is unnecessary. In this case, as a result of transmission of the execution result identifier from the web browser 300 to the function/user management unit 306 in step S9.1, the local user UUID and the usable function are displayed (FIG. 9C) based on the execution result selected to be re-executed by the user, and the execution request is transmitted to the function/user management unit 306 in step S5.8.

These are the descriptions about the processes from the display of the details of the error in the state in which the print function is "ended with error" to the re-execution. This makes it possible to check the details of the error and, furthermore, perform re-execution using information about the same function and the same local user UUID.

A leakage of the local user UUIDs held by the device 105 and the cloud user UUIDs held by the authentication server 103 may lead to spoofing of the user. For this reason, a common key is issued in the user association processing and signature information is attached in the function call processing to detect a falsification of the execution request to the device 105. As to a falsification of the execution request, for example, if the execution request to the device 105 is an execution request for "execution of the print function", the execution request can be falsified to execute an execution request that is not intended by the user, such as "change settings", in the device 105. In a fifth exemplary embodiment, the user association processing and the function call processing in a case of using the common key will be described below. Detailed description of the steps in the user association processing (FIG. 6, FIG. 7) and the function call processing (FIG. 8) in the first exemplary embodiment which are similar to those in the present exemplary embodiment is omitted.

First, the user association processing of associating the local user UUID and the cloud user UUID with each other in the authentication server 103 in a case of using the common key will be described below with reference to FIG. 6. Steps S3.11 and S3.12 are respectively replaced by steps S11.1 and S11.2 described below to realize the user association processing in the authentication server 103 when the common key is used. In steps S3.6 to S3.10, a request for association processing using the authentication link information is transmitted to the authentication unit 302 together with the user authentication link information input to the web browser 300 by the user. In step S11.1, the processing of associating the cloud user UUID and the authentication link information with each other is executed in the authentication unit 302, and a common key is issued with respect to the association information. Table 15 illustrates an example of the issued common key.

TABLE 15

| Device Identification Information | Cloud User UUID | Authentication Link Information | Common Key |
|---|---|---|---|
| 00001 | CCC1 | XXX-YYY-ZZZ | AAA1-CCC1-00001.cer |

In step S11.2, the authentication unit 302 combines the mapping table (Table 4) generated in step S2.10 and the mapping table (Table 15) generated in step S11.1 into a single mapping table and associates the cloud user UUID, the local user UUID, the device identification information, and the common key with each other. Table 16 illustrates an example of the association information generated at this time. More specifically, Tables 4 and 15 contain common authentication link information, so that the association information in Table 16 is generated via the common authentication link information.

TABLE 16

| Device Identification Information | Local User UUID | Cloud User UUID | Common Key |
|---|---|---|---|
| 00001 | AAA1 | CCC1 | AAA1-CCC1-00001.cer |

To associate a plurality of local user UUIDs with the cloud user UUID and the common key in the authentication server 103, the sequence in FIG. 6 needs to be repeated. Table 17 illustrates an example of a mapping generated in the function/user management unit 306 as a result of repeating the sequence.

TABLE 17

| Device Identification Information | Local User UUID | Cloud User UUID | Common Key |
|---|---|---|---|
| 00001 | AAA1 | CCC1 | AAA1-CCC1-00001.cer |
| 00001 | AAA2 | CCC1 | AAA2-CCC1-00001.cer |

These are the descriptions about the user association processing of associating the local user UUID and the cloud user UUID with each other using the common key in the authentication unit 302. In this way, the authentication unit 302 holds the common key associated with the local user UUID and the cloud user UUID.

Next, the user association processing of associating the local user UUID and the cloud user UUID with each other using the common key in the device 105 will be described below with reference to FIG. 21. In step S12.1, the authentication server 103 transmits to the communication control unit 303 a request for associating the authentication link information, the cloud user UUID, and the common key with each other. More specifically, the authentication unit 302 transmits to the communication control unit 303 a publish message together with the authentication link information input in step S3.9 and the common key issued in step S11.1. The topic at the time of transmitting the publish message is the device identification information. In this way, the publish message of the same topic as that of the subscribe message transmitted by the function call control unit 310 in step S2.15 can be transmitted. The message to be transmitted at this time by the authentication unit 302 does not have to be a MQTT publish message if the communication control unit 303 includes a function of conversion between MQTT and a different protocol.

In step S12.2, the communication control unit 303 transmits to the function call control unit 310 the publish message as a cloud user UUID association request. The cloud user UUID, the authentication link information, and the common key are transmitted together with the message. In step S12.3, the function call control unit 310 transmits the cloud user UUID association request to the authentication server link unit 309. At this time, the authentication link information, the cloud user UUID, and the common key received in step S12.2 are simultaneously transmitted. In step S12.4, the association processing is executed to associate the local user UUID, the cloud user UUID, and the common key with each other. The authentication server link unit 309 performs association processing using the association information generated in step S2.12, which associates the local user UUID with the authentication link information, and the cloud user UUID, the authentication link information, and the common key received in step S12.3.

These are the descriptions about the user association processing of associating the local user UUID and the cloud user UUID with each other using the common key in the device 105. In this way, the authentication server link unit 309 holds the common key associated with the local user UUID and the cloud user UUID. While the key exchange based on the common key infrastructure of symmetric key encryption is described above, the key infrastructure is not limited to the above-described key infrastructure and, for example, a public key infrastructure of asymmetric key encryption may be used. A possible configuration in this case is as follows. An asymmetric key pair (public key, private key) is issued by the authentication unit 302 in step S11.1, and the public key is transmitted to the function call control unit 310 in step S12.2. Thereafter, the authentication server link unit 309 issues an asymmetric key pair, and the public key is transmitted to the authentication unit 302. In a case in which the device 105 does not include the key issue function, the authentication unit 302 may issue two asymmetric key pairs. Further, the symmetric key encryption and the asymmetric key encryption are referred to as an encryption key in the exemplary embodiments of the present invention.

Next, the function call processing using the common key will be described below with reference to FIG. 22. Similar steps to those in FIG. 8 are given the same reference numerals, and the detailed description thereof is omitted.

In step S5.1, the web browser 300 accepts a usable function request operation through a user operation. In step S5.2, the web browser 300 transmits a usable function request to the communication control unit 303. In step S5.3, the function/user management unit 306 responds to the web browser 300 with usable functions. In step S5.4, the web browser 300 receives a function selection operation through a user operation. In step S5.5, the web browser 300 transmits a usable local user UUID request to the function/user management unit 306. In step S5.6, the function/user management unit 306 responds to the web browser 300 with the local user UUID usable by the logged-in cloud user based on the session ID received in step S5.5 and the association information (Table 12) managed by the function/user management unit 306. In step S5.7, the web browser 300 accepts a local user selection operation from the user. In step S5.8, the local user UUID selected in step S5.7 and an execution request for executing the function of the device 105 that is selected in step S5.4 are transmitted from the web browser 300 to the function/user management unit 306. In step S5.9, the function/user management unit 306 transmits to the print management unit 305 the local user UUID, the device identification information, and the execution request received in step S5.8. In step S5.10, the print management unit 305 transmits to the communication control unit 303 the local user UUID, the device identification information, and the execution request received in step S5.9.

In step S13.1, the communication control unit 303 transmits a common key acquisition request to the authentication unit 302. At this time, the local user UUID and the device identification information are transmitted to the authentication unit 302. Since the common key is issued with respect to the association information about the association between the local user UUID and the authentication link information in step S11.2, if the local user UUID is transmitted in step S13.1, the authentication unit 302 can identify the requested common key. In step S13.2, the authentication unit 302 transmits the common key as an acquisition response to the communication control unit 303 in response to the common key acquisition request. The communication control unit 303 acquires the common key so that the common key, the local user UUID, and the cloud user UUID are associated with each other in the service server 104.

In step S13.3, the communication control unit 303 attaches signature information in response to the execution request using the common key. The request to be transmitted is generated as a JSON Web Token (JWT) character string, and signature information defined by JSON Web Signature (JWS) is attached. The signature information format is not necessarily limited to JWT and JWA. The same applies to signature information described below.

In step S13.4, the communication control unit 303 transmits to the function call control unit 310 the local user UUID acquired in step S5.10 and the execution request with the signature information attached thereto in step S13.3 as a publish message. The topic at this time is the device identification information. In this way, the publish message of the same topic as that of the subscribe message transmitted from the function call control unit 310 in step S2.15 can be transmitted. In step S5.4, if the "print" function is selected by the user, then in step S13.4, an execution request for executing the print function is transmitted to the function call control unit 310. In step S13.5, the function call control unit 310 transmits to the authentication server link unit 309 an acquisition request for the cloud user UUID and the common key.

In step S13.6, the authentication server link unit 309 responds to the function call control unit 310 with the cloud user UUID and the common key. Since the local user UUID, the cloud user UUID, and the common key are associated with each other in the authentication server link unit 309 in step S12.4, the authentication server link unit 309 can identify the cloud user UUID and the common key to be transmitted as a response to the function call control unit 310.

In step S13.7, the function call control unit 310 verifies the signature information attached to the execution request using the common key received in step S13.6. After the verification, the print function is executed according to the contents of the publish message received in step S13.4. In step S13.8, the function call control unit 310 attaches the signature information to the execution result and responds to the communication control unit 303 with the execution result. In step S13.9, the function call control unit 310 verifies, using the common key received in step S13.2, the signature information attached to the execution result. In step S5.18, after the verification, the communication control unit 303 transmits to the print management unit 305 the cloud user UUID and the execution result with respect to the execution request. These are the descriptions about the function call processing using the common key. The fifth exemplary embodiment enables use of an open function of the device 105 via the client device 102 and detection of a falsification of an execution request to the device 105.

In the first exemplary embodiment, the user acquires the authentication link information at the device 105, the acquired authentication link information is input to the client device 102, and the local user UUID is associated with the cloud user UUID. In a sixth exemplary embodiment, a form will be described in which the authentication link information is acquired at the client device 102, the acquired authentication link information is input to the device 105, and the local user UUID is associated with the cloud user UUID.

Figure 23:
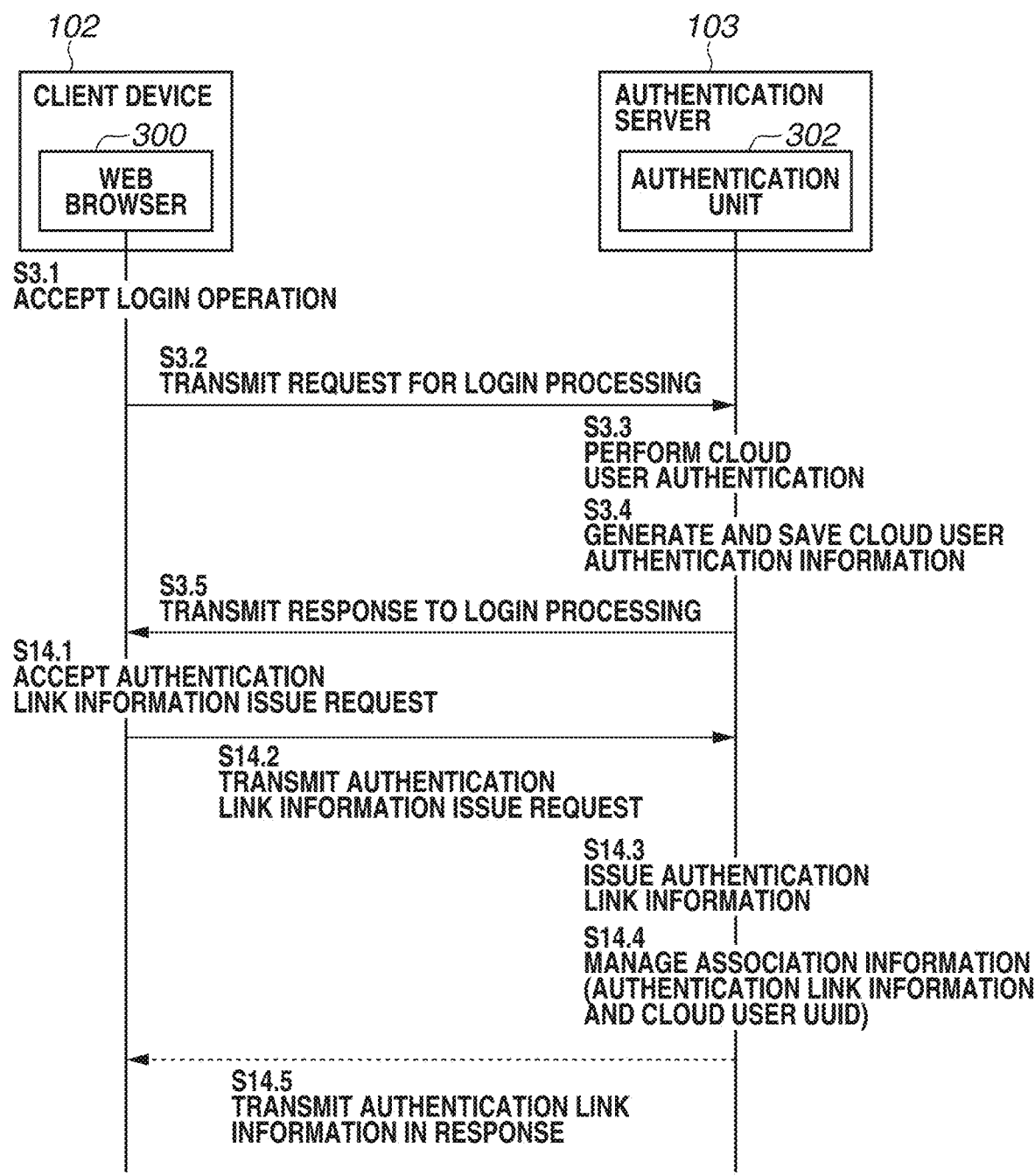
FIG. 23 is a sequence diagram illustrating a process of issuing authentication link information according to a sixth exemplary embodiment.

First, the authentication link information issue processing in the client device 102 will be described below with reference to FIG. 23. Assuming that the previously-generated cloud user authentication information is determined to be valid, the description of steps S3.1 to S3.5 is omitted. In step S14.1, the web browser 300 accepts an authentication link information issue request by a user operation. In step S14.2, the web browser 300 transmits the authentication link information issue request to the authentication unit 302. In step S14.3, the authentication unit 302 issues authentication link information in response to the received issue request. In step S14.4, the authentication unit 302 manages the association information associating the authentication link information issued in step S14.3 with the cloud user UUID. More specifically, since the authentication unit 302 receives the session ID together with the authentication link information issue request in step S14.2, the authentication link information issued in step S14.3 is associated with the cloud user UUID via the session ID. Table 18 illustrates an example of the association information generated at this time.

TABLE 18

| Cloud User UUID | Authentication Link Information |
|---|---|
| CCC1 | XXX-YYY-ZZZ |

In step S14.5, the authentication unit 302 responds to the web browser 300 with the authentication link information issued by the authentication unit 302, and the user can acquire the authentication link information. These are the descriptions about the authentication link information issue processing in the client device 102. The sequence from step S14.1 to step S14.5 is repeated to issue a plurality of pieces of authentication link information with respect to a single cloud user UUID. Table 19 illustrates an example of association information generated as a result of repeating the sequence twice.

TABLE 19

| Cloud User UUID | Authentication Link Information |
|---|---|
| CCC1 | XXX-YYY-ZZZ |
| CCC1 | AAA-BBB-CCC |

Figure 24:
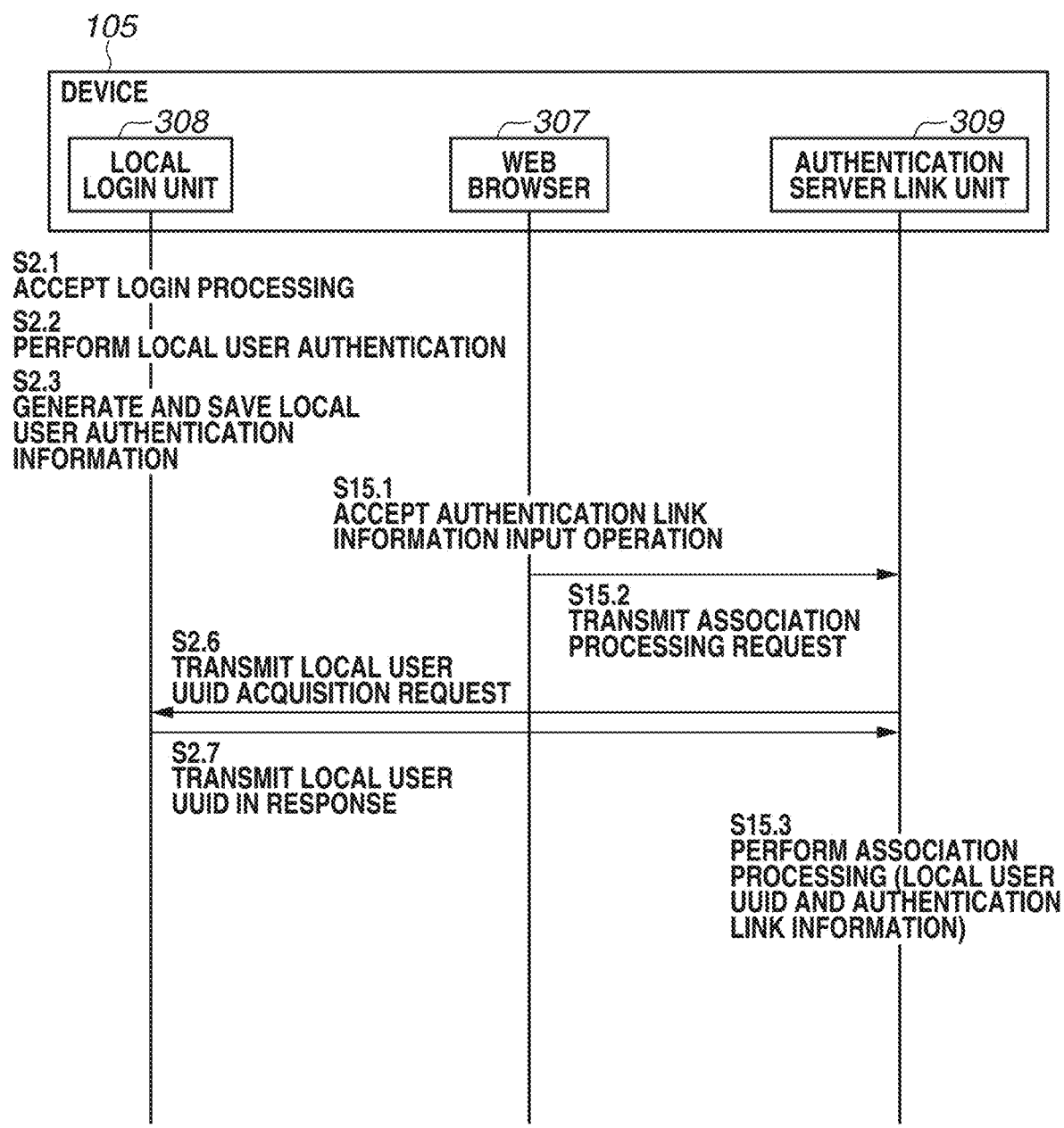
FIG. 24 is a sequence diagram illustrating a process of associating a local user UUID and authentication link information in the device according to an exemplary embodiment.

Next, the user association processing of associating the local user UUID and the authentication link information with each other in the device 105 will be described below with reference to FIG. 24. Descriptions of similar processes to those described above are omitted. In step S15.1, the web browser 307 accepts an authentication link information input operation from the user. In step S15.2, the web browser 307 transmits to the authentication server link unit 309 a request for authentication link information association processing. More specifically, the web browser 307 receives the authentication link information "XXX-YYY-ZZZ" by the user operation. In steps S2.6 and S2.7, the authentication server link unit 309 acquires the local user UUID from the local login unit 308. In step S15.3, the authentication server link unit 309 associates the authentication link information received in step S15.1 with the local user UUID received in step S2.7. Table 20 illustrates an example of association information generated at this time.

TABLE 20

| Local User UUID | Authentication Link Information |
|---|---|
| AAA1 | XXX-YYY-ZZZ |

These are the descriptions about the user association processing of associating the local user UUID and the authentication link information with each other in the device 105. The sequence illustrated in FIG. 24 is repeated so that a plurality of pieces of association information associating the local user UUID and the authentication link information with each other is managed in the device 105. Table 21 illustrates an example of association information generated as a result of repeating the sequence in FIG. 24 twice.

TABLE 21

| Local User UUID | Authentication Link Information |
|---|---|
| AAA1 | XXX-YYY-ZZZ |
| AAA1 | AAA-BBB-CCC |

Next, the user association processing of associating the local user UUID and the cloud user UUID with each other in the authentication server 103 and the device 105 will be described below with reference to FIG. 25. In step S16.1, the authentication server link unit 309 transmits to the authentication unit 302 the authentication link information, the local user UUID, and the device identification information simultaneously and transmits an authentication link information association request. Assuming that the authentication link information "XXX-YYY-ZZZ", the local user UUID "AAA1", and the device identification information "0001" are transmitted. In step S16.2, the authentication unit 302 performs association processing using the received authentication link information, the received local user UUID, and the received device identification information. Table 22 illustrates an example of association information generated at this time.

TABLE 22

| Device Identification Information | Local User UUID | Authentication Link Information |
|---|---|---|
| 00001 | AAA1 | XXX-YYY-ZZZ |

In step S16.3, the cloud user UUID, the local user UUID, and the device identification information are associated with each other using the association information (Table 18, Table 22) managed by the authentication unit 302. An example of the mapping table generated at this time is as illustrated in Table 9. In step S16.4, the authentication unit 302 transmits to the authentication server link unit 309 the cloud user UUID and the authentication link information in response to the association request. Assuming that the authentication link information "XXX-YYY-ZZZ" and the cloud user UUID "CCC1" are transmitted to the authentication server link unit 309. In step S16.5, the authentication server link unit 309 associates the authentication link information and the cloud user UUID received in step S16.4 with each other.

In step S16.6, the authentication server link unit 309 associates the cloud user UUID and the local user UUID with each other using the association information associated in step S16.5 and the association information (Table 20) associated in step S15.3. Table 23 illustrates an example of association information generated at this time.

TABLE 23

| Local User UUID | Cloud User UUID |
|---|---|
| AAA1 | CCC1 |

In step S16.7, the authentication server link unit 309 transmits to the web browser 307 a notification of the completion of the association processing in response to the association processing request in step S15.2. In this way, the user is notified of the completion of the association processing. These are the descriptions about the user association processing of associating the local user UUID and the cloud user UUID with each other in the authentication server 103 and the device 105. The sequence from step S16.1 to step S16.6 is repeated to generate a plurality of pieces of local user UUID association information with respect to a single cloud user UUID. Table 24 illustrates an example of association information acquired as a result of repeating the sequence twice.

TABLE 24

| Local User UUID | Cloud User UUID |
|---|---|
| AAA1 | CCC1 |
| AAA2 | CCC1 |

In this way, the client device 102 acquires the authentication link information, and the acquired authentication link information is input to the device 105 to associate the local user UUID and the cloud user UUID with each other. The function call processing after the user association processing of associating the local user UUID and the cloud user UUID with each other is similar to that in the first exemplary embodiment (FIG. 8), so that the description thereof is omitted.

Other Embodiments

The process of selecting the re-execution, which is described in the fourth exemplary embodiment, can be combined with the first to third exemplary embodiments because the process is a process to be executed after an execution result is selected by the service server 104. The process in the fifth exemplary embodiment can be combined with the first to fourth exemplary embodiments because the process is a process in which the common key is issued with respect to the association information about the local user UUID, the cloud user UUID, and the authentication link information, and the signature information is verified using the common key. The sixth exemplary embodiment is a different form of the authentication link information issue processing and the association information generation processing, so that the sixth exemplary embodiment can be combined with the function call processing and the subsequent processing. Further, those that are not described in the second to sixth exemplary embodiments are similar to those described in the first exemplary embodiment.

The information transmitted or received in the steps described in the above-described exemplary embodiments is not limited to the information described above as an example and can be any information containing the above-described information. In an alternative form, for example, the cloud user UUID is transmitted together with other cloud user authentication information such as the cloud user ID. The same applies to the case of the local user UUID.

While the form in which the web browser 300 displays the usable local user UUID is described in the above-described exemplary embodiments, the form of information to be displayed on the web browser 300 is not particularly limited and can be any information from which the user can uniquely identify a local user to be used.

Further, while the form in which a plurality of local user UUIDs is associated with a single cloud user UUID is described in the above-described exemplary embodiments, a form in which a plurality of cloud users UUID is associated with a plurality of local user UUIDs can work out as the above-described exemplary embodiments.

Further, the flow of the result acquisition processing described above is not limited to that illustrated in FIGS.

10A, 10B, and 11. In an alternative form, for example, the user does not conduct request selection at the time of requesting a result screen and views only the latest information from the previous execution results. Further, there can be a case in which instead of acquiring an execution result based on an execution result screen request from the user, an execution result screen is generated when the print management unit 305 acquires the execution result in step S5.18.

Further, the form is described above in which the user selects a function as illustrated in FIGS. 9A, 9B, and 9C and the local user UUID is selected and the function of the device 105 is executed. The form is not limited to this form. In an alternative default form, the local user UUID selected most recently by the cloud user and the function executed using the local user UUID are displayed from the beginning on the web browser 300 without user selection (FIG. 9C). Even if default settings are displayed as illustrated in FIG. 9C, a setting change to the local user UUID and the function to be used is possible as illustrated in FIG. 12. Further, the information to be displayed on the web browser 300 as the default form is not limited to the information selected most recently by the cloud user. In an alternative form, the local user UUID and the function of the device 105 that the user desires to use are set in advance, and the setting information is managed in association with the cloud user UUID.

While the local user UUID and the function of the device 105 are displayed on the same display screen of the web browser 300 (FIGS. 9A, 9B, 9C, 12, 14A, 14B, 14C, 16A, 16B, and 16C) in the above-described examples, there is another possible form in which the local user UUID is displayed on a different screen from the screen on which the usable function of the device 105 is displayed. For example, in FIG. 9B, "function" and "user allowed to execute function" are displayed on the same screen. In an alternative form, for example, if the user selects "function" on the web browser 300, the screen is changed to another screen on which only "executable user" is displayed, and the user can select "executable user".

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiments, it is possible to execute a function of the device 105 from the client device 102 via the cloud system 106 using the local user UUID associated with the cloud user UUID. Furthermore, it is possible to transmit a notification of a function execution result of the device 105 to the cloud user without using the identifier for associating the request with the response in the non-synchronized processing between the cloud system 106 and the device 105.

While various exemplary embodiments of the present invention are described above in detail, the present invention is not limited to a specific exemplary embodiment and can be modified and changed in various ways within the spirit of the claimed invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing system comprising:
one or more processors; and
one or more memories storing instructions that, when executed by the one or more processors, cause the information processing system to perform operations of:
a first management unit with which a cloud system manages at least cloud user authentication information for uniquely identifying a cloud user using a cloud service in association with a plurality of pieces of local user authentication information for uniquely identifying a local user using a function of a multi-user device, and information about the function of the multi-user device that is executable using the local user authentication information;
a display generation unit configured to display as a first display on a client device the information about the function of the multi-user device and display as a second display on the client device a plurality of pieces of local user authentication information in order to allow a user to select one piece of local user authentication information from among the plurality of pieces of local user authentication information, wherein the plurality of pieces of local user authentication information displayed on the second display are managed by the first management unit in association with the information about the function selected on the first display;
an acceptance unit configured to accept a selection of the function of the multi-user device on the first display and a selection of the local user authentication information on the second display; and
a first transmission unit with which the cloud system transmits to the multi-user device at least the local user authentication information accepted by the acceptance unit and the information about the function accepted by the acceptance unit,
wherein, when a first function is selected on the first display, first local user authentication information that is associated with the first function is displayed in the second display, but second local user authentication information that is not associated with the first function is not displayed in the second display.

2. The information processing system according to claim 1, wherein the information processing system is further caused to perform the operations of a second management unit with which the multi-user device manages the cloud user authentication information and the local user authentication information in association with each other.

3. The information processing system according to claim 2,
wherein the first management unit manages cloud association information that associates the cloud user authentication information and the local user authentication information with each other via authentication link information for associating the cloud user authentication information and the local user authentication information with each other, and
wherein the second management unit manages device association information that associates the cloud user authentication information and the local user authentication information with each other via the authentication link information.

4. The information processing system according to claim 3, wherein the cloud system issues the authentication link information if a user logs into the multi-user device and an issue request for issuing the authentication link information is transmitted to the cloud system.

5. The information processing system according to claim 3, wherein the cloud system issues the authentication link information if a user logs into the client device and an issue request for issuing the authentication link information is transmitted to the cloud system.

6. The information processing system according to claim 3, wherein the first transmission unit attaches signature information to the execution request for executing the function of the multi-user device by using an encryption key associated with the cloud association information and transmits the execution request with the signature information to the multi-user device, and the signature information is verified at the multi-user device.

7. The information processing system according to claim 3, wherein the second transmission unit attaches the signature information to the execution result by using an encryption key associated with the multi-user device association information and transmits the execution result with the signature information to the cloud system, and the signature information is verified at the cloud system.

8. The information processing system according to claim 1, wherein the information processing system is further caused to perform the operations of:
an execution unit with which the multi-user device executes an execution request transmitted by the first transmission unit based on the local user authentication information; and
a second transmission unit with which the multi-user device transmits to the cloud system the cloud user authentication information managed by the second management unit in association with the local user authentication information received together with the execution request from the cloud system and an execution result executed by the execution unit.

9. The information processing system according to claim 8, wherein the priority of the local user authentication information is an order of preferential use of the function of the multi-user device by the local user authentication information.

10. The information processing system according to claim 8, further comprising an execution result management unit configured to manage the execution result, the cloud user authentication information received together with the execution result, and the local user authentication information managed by the first management unit in association with the cloud user authentication information,
wherein the client device acquires the execution result from the execution result management unit and displays the execution result on a display screen, and the first transmission unit transmits again to the multi-user device an execution request executed by the execution unit according to user selection on the display screen.

11. The information processing system according to claim 10, wherein the display screen includes a mechanism for a user to select re-transmission of the execution request to the multi-user device based on the execution request executed by the execution unit.

12. The information processing system according to claim 1, wherein after the cloud user is authenticated by the cloud system based on the cloud user authentication information received from the client device, the first transmission unit transmits to the multi-user device the local user authentication information managed by the first management unit in association with the cloud user authentication information and the execution request for executing the function of the multi-user device that corresponds to the selection accepted by the acceptance unit.

13. The information processing system according to claim 1, wherein the local user authentication information to be displayed as the second display on the client device is selected based on the function of the multi-user device selected on the first display on the client device and a priority of the local user authentication information managed by the first management unit.

14. The information processing system according to claim 1,
wherein the cloud user authentication information is a cloud user universally unique identifier (UUID) based on which the cloud user is uniquely identified and which does not overlap with other cloud user authentication information, and
wherein the local user authentication information is a local user UUID based on which the local user is uniquely identified and which does not overlap with other local user authentication information.

15. An information processing system comprising:
one or more processors; and
one or more memories storing instructions that, when executed by the one or more processors, cause the information processing system to perform operations of:
a first management unit with which a cloud system manages at least cloud user authentication information for uniquely identifying a cloud user using a cloud service in association with a plurality of pieces of local user authentication information for uniquely identifying a local user using a function of a multi-user device, and information about the function of the multi-user device that is executable using the local user authentication information;
a display generation unit configured to display as a first display on a client device the plurality of pieces of local user authentication information in order to allow a user to select one piece of local user authentication information from among the plurality of pieces of local user authentication information, and display as a second display on the client device the information about the function of the multi-user device managed by the first management unit in association with the local user authentication information selected on the first display;

an acceptance unit configured to accept a selection of the local user authentication on the first display and accept a selection of the function of the multi-user device on the second display; and a first transmission unit with which the cloud system transmits to the multi-user device at least the local user authentication information accepted by the acceptance unit and the information about the function accepted by the acceptance unit, wherein, when first local user authentication information is selected on the first display, information about first function that is associated with the first local user authentication information is displayed in the second display, however, when second local user authentication information is selected on the first display, the information about the first function that is not associated with the second local user authentication information is not displayed on the second display.

16. The information processing system according to claim 15, wherein a second management unit with which the multi-user device manages the cloud user authentication information and the plurality of pieces of local user authentication information in association with each other.

17. The information processing system according to claim 15, wherein an execution unit with which the multi-user device executes the execution request transmitted by the first transmission unit based on the local user authentication information; and a second transmission unit with which the multi-user device transmits to the cloud system the cloud user authentication information managed by the second management unit in association with the local user authentication information received together with the execution request from the cloud system and an execution result executed by the execution unit.

18. The information processing system according to claim 15, wherein after the cloud user is authenticated by the cloud system based on the cloud user authentication information received from the client device, the first transmission unit transmits to the multi-user device the local user authentication information managed by the first management unit in association with the cloud user authentication information and the execution request for executing the function of the multi-user device corresponding to the selection accepted by the acceptance unit.

19. A control method comprising:

causing a cloud system to manage, with a first management unit, at least cloud user authentication information for uniquely identifying a cloud user using a cloud service in association with a plurality of pieces of local user authentication information for uniquely identifying a local user using a function of a multi-user device, and information about the function of the multi-user device that is executable using the local user authentication information;

displaying as a first display on a client device the information about the function of the multi-user device and display as a second display on the client device the plurality of pieces of local user authentication information in order to allow a user to select one piece of local user authentication information from among the plurality of pieces of local user authentication information, wherein the plurality of pieces of local user authentication information displayed on the second display are managed by the first management unit in association with the information about the function selected on the first display;

accepting, at an acceptance unit, a selection of the function of the multi-user device on the first display and a selection of the local user authentication information on the second display; and causing the cloud system to transmit to the multi-user device at least the local user authentication information accepted by the acceptance unit and the information about the function accepted by the acceptance unit, wherein, when a first function is selected on the first display, first local user authentication information that is associated with the first function is displayed in the second display, but second local user authentication information that is not associated with the first function is not displayed in the second display.

20. A control method comprising:

causing a cloud system to manage, with a first management unit, at least cloud user authentication information for uniquely identifying a cloud user using a cloud service in association with a plurality of pieces of local user authentication information for uniquely identifying a local user using a function of a multi-user device, and information about the function of the multi-user device that is executable using the local user authentication information;

displaying as a first display on a client device the plurality of pieces of local user authentication information in order to allow a user to select one piece of local user authentication information from among the plurality of pieces of local user authentication information, and display as a second display on the client device the information about the function of the multi-user device managed by the first management unit in association with the local user authentication information selected on the first display;

accepting a selection of the local user authentication on the first display and accept a selection of the function of the multi-user device on the second display; and causing the cloud system to transmit to the multi-user device at least the local user authentication information accepted by the acceptance unit and the information about the function accepted by the accepting, wherein, when first local user authentication information is selected on the first display, information about first function that is associated with the first local user authentication information is displayed in the second display, however, when second local user authentication information is selected on the first display, the information about the first function that is not associated with the second local user authentication information is not displayed on the second display.

* * * * *